United States Patent
Qiu et al.

(10) Patent No.: US 12,035,034 B2
(45) Date of Patent: Jul. 9, 2024

(54) METHOD, APPARATUS, DEVICE AND STORAGE MEDIUM FOR IMAGE SHOOTING

(71) Applicant: DOUYIN VISION (BEIJING) CO., LTD., Beijing (CN)

(72) Inventors: Hao Qiu, Beijing (CN); Yang Wang, Beijing (CN); Anqi Wang, Beijing (CN)

(73) Assignee: DOUYIN VISION (BEIJING) CO., LTD. (CN)

(*) Notice: Subject to any disclaimer, the term of this patent is extended or adjusted under 35 U.S.C. 154(b) by 0 days.

(21) Appl. No.: 17/934,946

(22) Filed: Sep. 23, 2022

(65) Prior Publication Data
US 2024/0015388 A1    Jan. 11, 2024

(30) Foreign Application Priority Data
Jul. 7, 2022   (CN) .......................... 202210803525.3

(51) Int. Cl.
*H04N 23/63*      (2023.01)
*G06T 5/00*       (2006.01)
(Continued)

(52) U.S. Cl.
CPC .......... *H04N 23/631* (2023.01); *G06T 5/002* (2013.01); *H04N 5/265* (2013.01); *H04N 23/633* (2023.01); *H04N 23/64* (2023.01)

(58) Field of Classification Search
CPC ....... H04N 5/232933; H04N 5/232939; H04N 5/23222; H04N 5/265; G06T 5/002
(Continued)

(56) References Cited

U.S. PATENT DOCUMENTS

| | | |
|---|---|---|
| 7,823,056 B1 | 10/2010 | Davey et al. |
| 8,665,333 B1 | 3/2014 | Sharma et al. |

(Continued)

FOREIGN PATENT DOCUMENTS

| | | |
|---|---|---|
| CN | 101388988 A | 3/2009 |
| CN | 102568260 A | 7/2012 |

(Continued)

OTHER PUBLICATIONS

Office Action issued Aug. 22, 2023 in U.S. Appln. No. 18/195,809 (9 pages).

(Continued)

*Primary Examiner* — Pritham D Prabhakher

(57) ABSTRACT

According to embodiments of the present disclosure, a method, apparatus, device and storage medium for image shooting are provided. The method comprises initiating a first camera and a second camera different from the first camera for image shooting. The method further comprises presenting a shooting page in a graphical user interface displayed by a display device. The shooting page comprises a first shooting window for presenting a first scene captured by the first camera and a second shooting window for presenting a second scene captured by the second camera. The method further comprises presenting a composite image on the shooting page in the graphical user interface in response to an indication of shooting completion. The composite image is generated based on a first image taken by the first camera and a second image taken by the second camera. In this way, flexible and interesting image shooting experience is provided.

18 Claims, 16 Drawing Sheets

(51) Int. Cl.
*H04N 5/265* (2006.01)
*H04N 23/60* (2023.01)

(58) Field of Classification Search
USPC .................................................. 348/222.1
See application file for complete search history.

(56) References Cited

U.S. PATENT DOCUMENTS

| | | | |
|---|---|---|---|
| 8,953,079 B2* | 2/2015 | Raju | H04N 7/147 348/14.02 |
| 9,325,903 B2* | 4/2016 | Kim | H04N 23/631 |
| 9,349,414 B1 | 5/2016 | Furment et al. | |
| 9,491,367 B2* | 11/2016 | Lee | G06F 3/14 |
| 9,509,916 B2* | 11/2016 | Li | H04N 23/635 |
| 9,565,333 B2* | 2/2017 | Kim | H04N 23/63 |
| 9,578,233 B2* | 2/2017 | Aoyama | H04N 5/272 |
| 10,007,476 B1 | 6/2018 | Glikmann | |
| 10,136,069 B2* | 11/2018 | Kim | H04N 23/45 |
| 10,200,599 B1 | 2/2019 | Baldwin | |
| 10,652,198 B1 | 5/2020 | Morrison et al. | |
| 10,693,956 B1 | 6/2020 | Green et al. | |
| 10,944,908 B2* | 3/2021 | An | H04N 5/262 |
| 11,115,591 B2* | 9/2021 | Wei | H04N 23/45 |
| 11,115,598 B2* | 9/2021 | Yim | H04N 23/69 |
| 11,258,736 B2 | 2/2022 | Shelley | |
| 11,412,276 B2 | 8/2022 | Bloch et al. | |
| 11,470,051 B1 | 10/2022 | Berkas et al. | |
| 2004/0179816 A1 | 9/2004 | Takehana | |
| 2005/0232586 A1 | 10/2005 | Tsuchiya et al. | |
| 2009/0141981 A1* | 6/2009 | Chan | H04N 23/611 382/190 |
| 2010/0077289 A1 | 3/2010 | Das et al. | |
| 2010/0251109 A1 | 9/2010 | Jin et al. | |
| 2010/0281375 A1 | 11/2010 | Pendergast et al. | |
| 2012/0081392 A1* | 4/2012 | Arthur | H04N 23/64 345/633 |
| 2012/0120186 A1* | 5/2012 | Diaz | H04N 5/77 348/E13.001 |
| 2012/0268552 A1* | 10/2012 | Choi | H04N 23/63 382/284 |
| 2012/0274808 A1* | 11/2012 | Chong | H04N 23/631 348/E9.053 |
| 2013/0111366 A1 | 5/2013 | Silbey et al. | |
| 2013/0125000 A1 | 5/2013 | Fleischhauer et al. | |
| 2013/0227414 A1 | 8/2013 | Hwang et al. | |
| 2013/0235224 A1* | 9/2013 | Park | H04N 23/64 348/E5.024 |
| 2013/0298026 A1 | 11/2013 | Fitzpatrick | |
| 2013/0329100 A1 | 12/2013 | Desai et al. | |
| 2014/0047371 A1 | 2/2014 | Palmer et al. | |
| 2014/0192212 A1 | 7/2014 | He et al. | |
| 2014/0229544 A1 | 8/2014 | Evans et al. | |
| 2014/0232904 A1 | 8/2014 | Na et al. | |
| 2014/0232906 A1 | 8/2014 | Ha et al. | |
| 2014/0240551 A1 | 8/2014 | Kim et al. | |
| 2014/0267842 A1* | 9/2014 | Lee | H04N 23/80 348/262 |
| 2014/0324605 A1 | 10/2014 | Steelberg et al. | |
| 2015/0062434 A1 | 3/2015 | Deng et al. | |
| 2015/0163562 A1 | 6/2015 | Leventhal et al. | |
| 2015/0277638 A1 | 10/2015 | Bustamante | |
| 2015/0288742 A1 | 10/2015 | Flynn et al. | |
| 2015/0363811 A1 | 12/2015 | Candillier | |
| 2016/0224767 A1 | 8/2016 | Steelberg | |
| 2016/0248864 A1 | 8/2016 | Lola et al. | |
| 2016/0249108 A1 | 8/2016 | Sexton | |
| 2016/0284383 A1 | 9/2016 | Kozakura | |
| 2016/0366294 A1 | 12/2016 | Uroskin et al. | |
| 2017/0064208 A1 | 3/2017 | Salimpour et al. | |
| 2017/0085803 A1 | 3/2017 | Chin et al. | |
| 2017/0195615 A1 | 7/2017 | Han et al. | |
| 2017/0201714 A1 | 7/2017 | Kim et al. | |
| 2017/0256288 A1 | 9/2017 | Ai et al. | |
| 2017/0289462 A1 | 10/2017 | Eum et al. | |
| 2017/0337652 A1 | 11/2017 | Sarin | |
| 2018/0033153 A1 | 2/2018 | Hirasawa et al. | |
| 2018/0234589 A1 | 8/2018 | Xiao | |
| 2018/0376078 A1 | 12/2018 | Adachi et al. | |
| 2019/0005253 A1 | 1/2019 | Floury et al. | |
| 2019/0014372 A1 | 1/2019 | Kandagal et al. | |
| 2019/0075066 A1 | 3/2019 | Cho et al. | |
| 2019/0087938 A1 | 3/2019 | Iddings | |
| 2019/0174056 A1* | 6/2019 | Jung | G06N 3/088 |
| 2019/0199926 A1* | 6/2019 | An | G06T 7/80 |
| 2019/0288972 A1 | 9/2019 | Morrison | |
| 2019/0342616 A1 | 11/2019 | Domm et a. | |
| 2020/0099838 A1 | 3/2020 | Song et al. | |
| 2020/0106952 A1* | 4/2020 | Missig | H04N 7/141 |
| 2020/0223454 A1 | 7/2020 | Fox et al. | |
| 2020/0302414 A1 | 9/2020 | Pachera | |
| 2021/0014415 A1* | 1/2021 | Wei | H04N 5/265 |
| 2021/0026511 A1 | 1/2021 | Ye et al. | |
| 2021/0027576 A1 | 1/2021 | Nelson et al. | |
| 2021/0051295 A1 | 2/2021 | Khawam | |
| 2021/0067741 A1* | 3/2021 | Yoshizawa | H04N 23/661 |
| 2021/0152753 A1* | 5/2021 | Zhu | H04N 5/265 |
| 2021/0297604 A1 | 9/2021 | Matiossian | |
| 2022/0159183 A1* | 5/2022 | Li | H04N 23/667 |
| 2022/0239832 A1 | 7/2022 | Tyagi et al. | |
| 2022/0294992 A1* | 9/2022 | Manzari | H04N 23/633 |
| 2022/0377254 A1 | 11/2022 | Wang et al. | |
| 2023/0007085 A1 | 1/2023 | Berliner et al. | |
| 2023/0076870 A1 | 3/2023 | Arnold et al. | |
| 2023/0088720 A1 | 3/2023 | Wang et al. | |

FOREIGN PATENT DOCUMENTS

| | | |
|---|---|---|
| CN | 102938825 A | 2/2013 |
| CN | 103745736 A | 4/2014 |
| CN | 104104870 A | 10/2014 |
| CN | 104980659 A | 10/2015 |
| CN | 105009566 A | 10/2015 |
| CN | 105103535 A | 11/2015 |
| CN | 105376396 A | 3/2016 |
| CN | 106060526 A | 10/2016 |
| CN | 106165430 A | 11/2016 |
| CN | 106210629 A | 12/2016 |
| CN | 106231095 A | 12/2016 |
| CN | 106559686 A | 4/2017 |
| CN | 106662965 A | 5/2017 |
| CN | 106851162 A | 6/2017 |
| CN | 106973234 A | 7/2017 |
| CN | 107105315 A | 8/2017 |
| CN | 107509029 A | 12/2017 |
| CN | 107566725 A | 1/2018 |
| CN | 107846547 A | 3/2018 |
| CN | 109089059 A | 3/2018 |
| CN | 108419016 A | 8/2018 |
| CN | 109151537 A | 1/2019 |
| CN | 109167937 A | 1/2019 |
| CN | 1061165430 A | 1/2019 |
| CN | 110166652 A | 8/2019 |
| CN | 110740261 A | 1/2020 |
| CN | 110784674 A | 2/2020 |
| CN | 110784674 B | 2/2020 |
| CN | 110809100 A | 2/2020 |
| CN | 110830714 B | 2/2020 |
| CN | 112004032 A | 11/2020 |
| CN | 306373989 S | 3/2021 |
| CN | 113422903 A | 9/2021 |
| CN | 113497894 A | 10/2021 |
| CN | 115334246 A | 11/2022 |
| EP | 1841225 A3 | 3/2008 |

OTHER PUBLICATIONS

International Search Report dated October 17, 2023 in PCT/CN2023/105002, English translation (9 pages).
International Search Report issued Feb. 2, 2021 in International Application No. PCT/CN2020/124036.
International Search Report issued Jan. 11, 2021 in International Application No. PCT/CN2020/124038.

(56) References Cited

OTHER PUBLICATIONS

First Office Action issued Oct. 20, 2020 in Chinese Application No. 201911047107.0, with English translation (16 pages).
Second Office Action issued Apr. 20, 2021 in Chinese Application No. 201911047107.0, with English translation (21 pages).
First Office Action issued Feb. 2, 2021 in Chinese Application No. 201911047128.2, with English translation (22 pages).
Android implements a View style (example demo) that follows the finger drag and automatically borders, Jan. 13, 2017 (10 pages).
First Office Action issued Feb. 2, 2021 in Chinese Application No. 201911047141.8, with English translation (24 pages).
Non-Final Office Action issued Jul. 22, 2022 in U.S. Appl. No. 17/733,958.
Final Office Action issued Nov. 16, 2022 in U.S. Appl. No. 17/733,958.
Non-Final Office Action issued Feb. 17, 2023 in U.S. Appl. No. 17/733,958.
Non-Final Office Action issued Oct. 5, 2023 in U.S. Appl. No. 17/733,958.
Non-Final Office Action issued Apr. 12, 2023 in U.S. Appl. No. 17/773,573.
First Office Action issued Nov. 17, 2022 in Indian Application No. 202227025132, with English translation (7 pages).
International Search Report issued Nov. 20, 2023 in International Application No. PCT/CN2023/116256, with English translation (10 pages).
Final Office Action issued Dec. 21, 2023 in U.S. Appl. No. 17/733,958 (26 pages).
Office Action issued Aug. 22, 2023 in U.S. Appl. No. 18/195,809 (9 pages).
International Search Report dated Oct. 17, 2023 in PCT/CN2023/105002, English translation (9 pages).
International Search Report issued Nov. 20, 2023 in PCT/CN2023/116256, English translation (10 pages).
Office Action issued Nov. 29, 2023 in CN Appl. No. 202211086344.X, English translation (21 pages).
Non-Final Office Action issued Feb. 28, 2024 in U.S. Appl. No. 17/934,909 (37 pages).
Non-Final Office Action issued Mar. 18, 2024 in U.S. Appl. No. 18/398,056 (36 pages).

* cited by examiner

METHOD, APPARATUS, DEVICE AND STORAGE MEDIUM FOR IMAGE SHOOTING

CROSS-REFERENCE TO RELATED APPLICATIONS

This application claims priority to Chinese Patent Application No. 202210803525.3 filed with the China National Intellectual Property Administration (CNIPA) on Jul. 7, 2022, the disclosure of which is incorporated herein by reference in its entirety.

TECHNICAL FIELD

Example embodiments of the present disclosure generally relate to the computer field, and specifically, to a method, apparatus, device and computer-readable storage medium for image shooting.

BACKGROUND

More applications are currently designed to provide various services to users. Users may use such content sharing applications to view, comment and repost various content such as multimedia content including videos, pictures, picture collections, sound, and so on. Content sharing applications further allow users to create and post multimedia content like pictures or videos. Application providers try to encourage more users to participate in content creating and posting. This can provide more and richer multimedia content on the platform while increasing the user stickiness to the applications.

SUMMARY

In a first aspect of the present disclosure, a method for image shooting is provided. The method comprises initiating a first camera and a second camera different from the first camera for image shooting. The method further comprises presenting, in a graphical user interface displayed by a display device, a shooting page. The shooting page comprises a first shooting window for presenting a first scene captured by the first camera and a second shooting window for presenting a second scene captured by the second camera. The method further comprises presenting, in the graphical user interface, a composite image on the shooting page in response to an indication of shooting completion. The composite image is generated based on a first image taken by the first camera and a second image taken by the second camera.

In a second aspect of the present disclosure, an electronic device is provided. The device comprises: at least one processing unit; a first camera and a second camera different from the first camera; a display device; and at least one memory, coupled to the at least one processing unit and storing instructions to be executed by the at least one processing unit. The instructions, when executed by the at least one processing unit, cause the device to perform a method according to the first aspect.

In a third aspect of the present disclosure, a computer-readable storage medium is provided. A computer program is stored on the medium, which, when executed by a processor, implements a method according to the first aspect.

It is to be understood that the Summary is neither intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
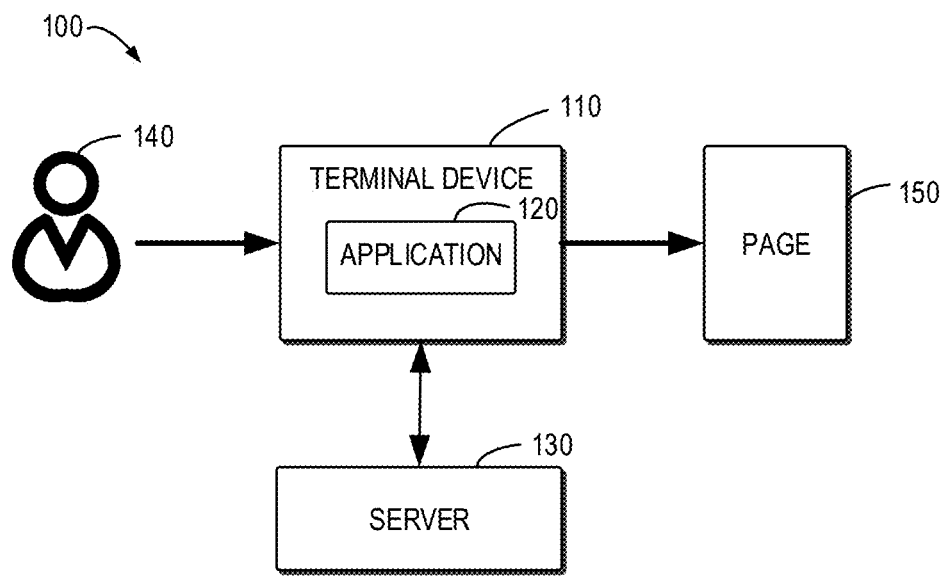
FIG. 1 illustrates a schematic view of an example environment in which embodiments of the present disclosure can be implemented.

Embodiments of the present disclosure will be described in more detail with reference to the accompanying drawings, in which some embodiments of the present disclosure have been illustrated. However, it is to be understood that the present disclosure can be implemented in various manners, and thus should not be construed to be limited to embodiments disclosed herein. On the contrary, those embodiments are provided for the thorough and complete understanding of the present disclosure. It is to be understood that the drawings and embodiments of the present disclosure are merely for the purpose of illustration, rather than limiting the protection scope of the present disclosure.

In the description of the embodiments of the present disclosure, the term "includes" and its variants are to be read as open terms that mean "includes, but is not limited to." The term "based on" is to be read as "based at least in part on." The terms "one embodiment" or "the embodiment" are to be read as "at least one embodiment." The term "some embodiments" is to be read as "at least some embodiments." Other definitions, either explicit or implicit, may be included below.

As used herein, the term "image" may refer to multimedia content such as a still image or picture (e.g., photo), a moving image or picture (e.g., video) and the like. The image may be taken by a single camera or composited from multiple images taken by multiple cameras.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various embodiments of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 illustrates a schematic view of an example environment 100 in which the embodiments of the present disclosure can be implemented. In the example environment 100, an application 120 is installed in a terminal device 110. A user 140 may interact with the application 120 via the terminal device 110 and/or a device attached to the terminal device 110. The application 120 may be a content sharing application that can provide the user 140 with various services related to multimedia content, such as work browsing, commenting, reposting, creating (e.g., shooting and/or editing) and posting multimedia content. As used herein, "multimedia content" may be content in various forms, including videos, audios, pictures, picture collections, text, etc.

In the environment 100 of FIG. 1, if the application 120 is in active state, the terminal device 110 may present a page 150 of the application 120. In some embodiments, the terminal device 110 may be provided with a display device (not shown) or communicatively connected with a display device. The page 150 may be presented in a graphical user interface (GUI) displayed by the display device. For the sake of illustration, unless otherwise specified, pages, windows or other graphical representations described hereinafter may be displayed in the GUI displayed by the display device.

In some embodiments, the page 150 may include various pages which the application 120 can provide, such as a multimedia content presenting page, a content creating page, a content posting page, a message page, a personal page, etc. The application 120 may provide a content creating function to shoot and/or creating multimedia content, so that the user 140 can edit the taken or uploaded multimedia content, etc. The application 120 may further have a posting content to allow the user 140 to post the created multimedia content.

In some embodiments, the terminal device 110 may be provided with a plurality of cameras or communicatively connected with a plurality of external cameras. For example, the terminal device 110 may be provided with a first camera and a second camera to shoot multimedia content.

In some embodiments, the terminal device 110 communicates with a server 130 to provide services of the application 120. The terminal device 110 may be any type of mobile, fixed or portable terminal, including a mobile phone, a desktop computer, a laptop computer, a notebook computer, a netbook computer, a tablet computer, a media computer, a multimedia tablet, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. In some embodiments, the terminal device 110 can also support any type of interface (such as a "wearable" circuit, and the like) for the user 140. The server 130 is various types of computing system/server that can provide computing capability, including, without limitation to, a mainframe, an edge computing node, a computing device in a cloud environment, etc.

It is to be understood that the structures and functionalities of various elements in the environment 100 have been described only for the purpose of illustration, rather than limiting the scope of the present disclosure. In the environment 100, there may exist any number of servers and any number of terminal devices. Different terminal devices may communicate with the same or different servers.

As described above, more applications, e.g., content sharing applications are designed to provide various services to users. Usually, some content sharing application will provide a function of shooting multimedia content. For example, multimedia content may include those such as videos, pictures, picture collections, sounds and the like.

Some conventional content sharing applications can provide the function of shooting multimedia content of a single scene. For example, these applications usually only support a front camera or a rear camera to take images. However, sometimes users might wish to shoot multimedia content of more than one scene to share richer content.

According to embodiments of the present disclosure, proposed is an improved solution for image shooting. In starting the shooting, both the first and second cameras can be initiated to shoot different scenes respectively. During the shooting, a first scene captured by the first camera and a second scene captured by the second camera can be simultaneously presented in the presented shooting page. Upon completion of the shooting, a composition image generated based on a first image taken by the first camera and a second image taken by the second camera is presented.

In this way, two different cameras, such as the front camera and the rear camera, can be used to shoot different scenes and composite a final composition image for presenting. The composition image generated as such can present richer content. This flexible image generating solution can improve user participation and experience. In addition, embodiments of the present solution enable the joint shooting of two different cameras. As a result, the shooting process is simple, the user operation complexity is reduced. The user can create content more conveniently and quickly, and different shooting requirements can be met.

Some example embodiments of the present disclosure will be described with reference to the drawings below.

Figure 2:
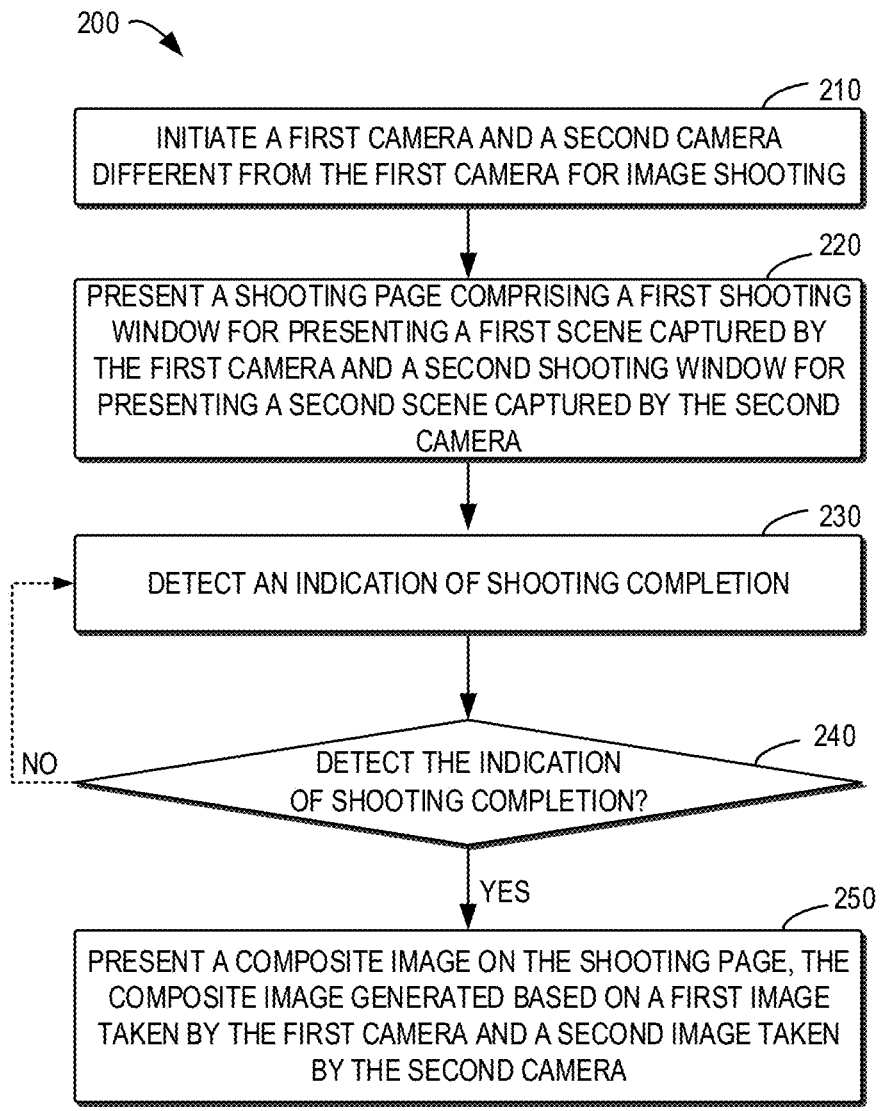
FIG. 2 illustrates a flowchart of a process for image shooting according to some embodiments of the present disclosure.

FIG. 2 illustrates a flowchart of a process 200 for image shooting according to some embodiments of the present disclosure. The process 200 can be implemented at the terminal device 110. For the sake of discussion, the process 200 will be described with reference to the environment 100 in FIG. 1. It is to be understood that the process 200 may include an additional act which is not shown and/or omit an act which is shown, and the scope of the present disclosure is not limited in this regard.

At block 210, the terminal device 110 initiates a first camera and a second camera different from the first camera for image shooting. For example, in some embodiments, the first camera is a rear camera built in the terminal device 110, and the second camera is a front camera built in the terminal device 110. In other embodiments, the first camera may be the front camera built in the terminal device 110, while the second camera may be the rear camera built in the terminal device 110. As another example, the first camera may be a front or rear camera built in the terminal device 110, and the second camera may be an external camera communicatively coupled with the terminal device 110. Although the first camera and the second camera are initiated for shooting in the present description, it is to be understood that more than two cameras can be initiated for shooting. For the sake of discussion, unless otherwise specified, discussion is presented below in the context that the first camera is a rear camera and the second camera is a front camera.

In some embodiments, the application 120 installed on the terminal device 110 may provide a shooting function. With the shooting function activated, the first camera and the second camera can be initiated to shoot images. For example, the terminal device 110 can detect a shooting start command. The shooting start command is used to trigger the start of shooting. If the shooting start command is detected, then the terminal device 110 triggers the shooting function, e.g., by initiating the first and second cameras.

In some embodiments, the terminal device 110 may detect the shooting start command for the application 120 and initiate the first and second cameras if the shooting start command is detected.

In some embodiments, a shooting start control may be provided in a page which is currently presented in the application 120. For example, the currently presented page may be presented in a GUI displayed by a display device in the terminal device 110 or connected to the terminal device 110. In response to detecting that the shooting start control is triggered, the shooting start command is detected. It is possible to trigger the shooting start control by, e.g., clicking or selecting it, via voice, or the like. In some embodiments, in addition to or instead of triggering the shooting start control, the shooting start command can be triggered in other ways such as voice control, hard buttons, and specific gestures (e.g., swipe gestures) in specific pages. Scope of the present disclosure is not limited in this regard.

To better understand the example embodiments, description is presented below with reference to example pages.

Figure 3A:
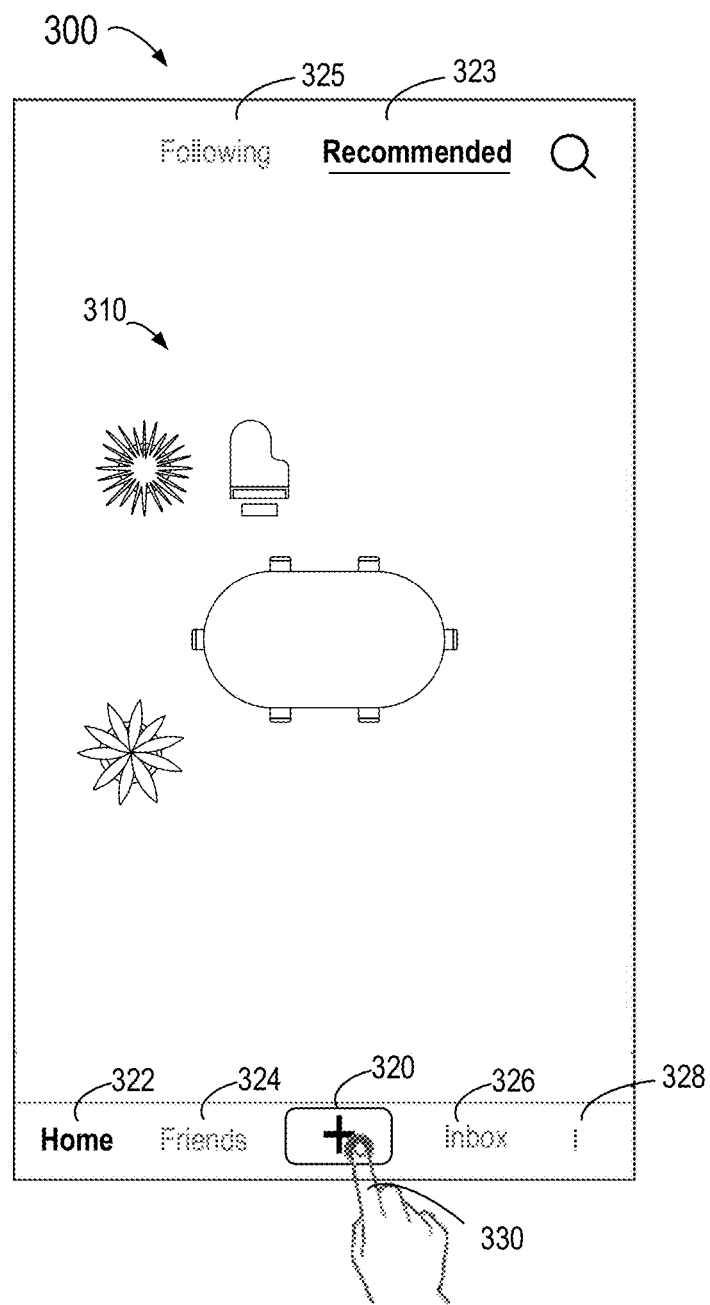
FIGS. 3A to 3C each illustrate a schematic view of an example page of an application according to some embodiments of the present disclosure.

FIG. 3A illustrates an example page 300 of the application 120. The page 300 can be any page of the application 120. In the example of FIG. 3A, the page 300 is a content presenting page in which an image 310 is presented. The page 300 includes a shooting start control 320 for triggering the initiation of the first and second cameras for the shooting. The page 300 may be presented in the GUI displayed by the display device.

In addition to the shooting start control 320, the page 300 further includes navigation tab bars for navigations to various pages. A "lower navigation tab bar" in the lower part of the page 300 includes navigation tabs 322, 324, 326 and 328. The navigation tab 322 has the characters "Home" indicating that the navigation tab corresponds to the home page of application 120; the navigation tab 324 has the characters "Friends" indicating that the navigation tab corresponds to the friend content page of the application 120; the navigation tab 326 has the characters "Inbox" indicating that the navigation tab corresponds to the inbox page (also referred to as the message page) of the application 120; the navigation tab 328 has the character "I" indicating that the navigation tab corresponds to the user's personal page.

An "upper navigation tab bar" in the upper part of the page 300 includes lower-level navigation tabs of the navigation tab 322, i.e., navigation tabs 323 and 325. The navigation tab 323 has the characters "Recommended" indicating a recommended content page in which recommended content of the application 120 may be presented; the navigation tab 325 has the characters "Following" indicating a following content page in which content of following users may be presented. The page 300 corresponds to the page of the navigation tab "Recommended" 323 under the navigation tab "Home" 322, in which the recommended content, i.e., the image 310 is presented.

It is to be understood that the page 300 in FIG. 3A and pages in other drawings to be described below are merely example pages, and various page designs may exist in practice. Various graphical elements in the page may have different arrangements and different visual representations, where one or more of them may be omitted or replaced, and one or more other elements may further exist. The embodiments of the present disclosure are not limited in this regard. For example, an indication such as "post a shared content" may be presented in the page 300 to prompt the user 140 to take an image and post the same. It should further be appreciated that besides the example page 300, other page of the application 120 may present the shooting start control and/or allow to initiate the shooting start command in other way.

In the page 300, if the user 140 triggers (e.g., the user's finger 330 clicks or touches) the shooting start control 320, the terminal device 110 will detect the shooting start command and initiate the first camera and the second camera.

It is to be understood that the enumerated page 300 including the shooting start control is merely for illustration purpose. The user 140 may trigger the shooting start control in another page. As discussed above, in response to receiving a camera initiating command, the terminal device 110 can initiate the first and second cameras. In some embodiments, the camera initiating command may be provided by the user in response to a system message about taking a composite image. For example, the page 300 may be displayed by triggering the system message about taking a composite image in other page. FIGS. 3B to 3E each illustrate schematic views of a page of pushing a system message about taking a composite image to a user according to some embodiments of the present disclosure. For example, the terminal device 110 may push a system message 342 to the user 140 in a lock-screen page 340 in FIG. 3B. For another example, the terminal device 110 may further push the system message 342 to the user 140 in any other way, e.g., an active page 350 in FIG. 3C.

In some embodiments, the system message 342 may prompt the user to take and share a composite image. It is to be understood that the text of the system message presented in FIG. 3B and to be presented below is merely for the purpose of illustration without suggesting any limitation. The system message 342 may include any appropriate text, symbols, stickers or photographs that prompt the user 140 to take and share images. The system message 342 may also be in any language.

Alternatively, or in addition, in some embodiments, the system message 342 may further indicate time limit information for prompting a user to take and post content information of a corresponding content category within the time limit or a specified time. An example of the system message 342 is "Please take a composite image and share it within five minutes!". It is to be understood that the above enumerated time limit such as five minutes is merely exemplary and not limiting. In some embodiments, the system message may indicate a content category. The content category may be at least one of content categories of the first image and the second image indicated by the system message. For example, the system message may indicate that the first and second images are both pictures or videos, or one of them is a picture and the other is a video. Scope of the present disclosure are not limited in this regard.

Figure 3B:
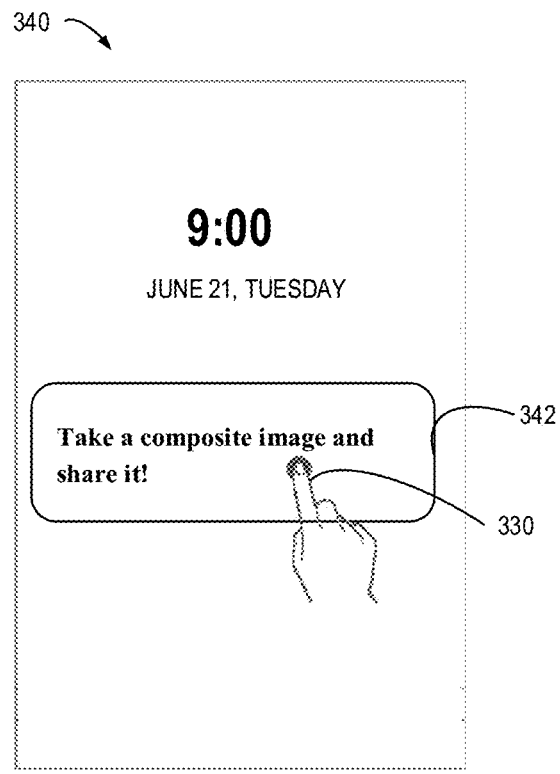
Figure 3C:
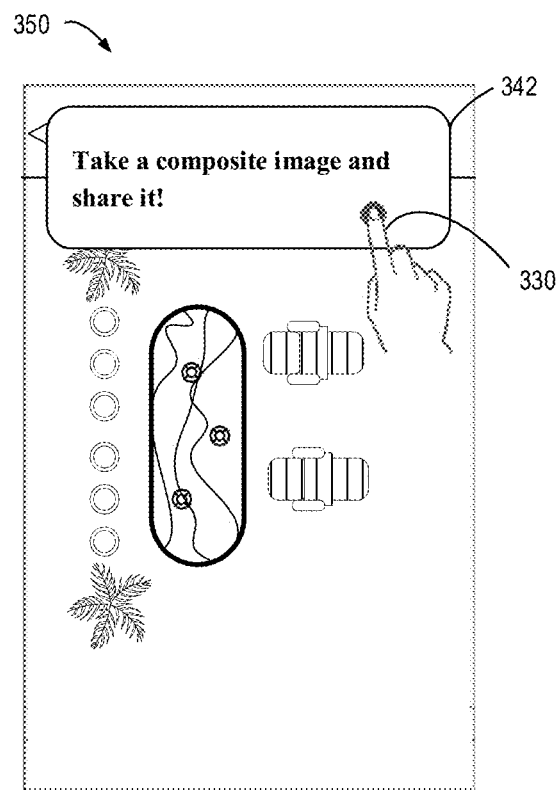

In some embodiments, if the user 140 clicks on or touches the system message 342, e.g., with her/his finger 330, a composite image shooting activity will be triggered, for example, the application 120 is triggered. In response to receiving the triggering event from the user 140, the terminal device 110 may launch the application 120. It is to be understood that, in some embodiments, the user 140 may also trigger content sharing by means of a touch device, a pointing device and the like. Scope of the present disclosure are not limited in this regard. It is noted that for purposes of illustration, touch gesture-based user selection is illustrated in FIG. 3B and some subsequent embodiments. However, it is to be understood that depending on the capability of the terminal device 110, other methods for receiving user selection may exist, such as mouse selection, voice control, etc.

In some embodiments, when the terminal device 110 triggers the application 120, the flow goes to the page 300 as shown in FIG. 3A. In the page 300, the first camera and the second camera may be initiated by triggering the shooting start control 320.

Alternatively, or in addition, in some embodiments, the above system message, besides being posted to the terminal device 110 of the user 140, is further sent to a device of other user.

In this way, the user 140 and other user can be instructed to take a composite image of the same content category. For example, the system message may be sent to terminal devices of a group of users respectively, instructing these users to complete the shooting of a composite image and post it within a certain time period (also referred to as a posting time limit).

In some embodiments, the user 140 may only post content within the time limit specified by the posting time limit. If the time limit expires, the user 140 is allowed to post content. Alternatively, or in addition, in some embodiments, even if the content posting time limit expires, the user 140 is still allowed to post content. In such an example where the user 140 posts content later than the content posting time limit, information indicating that the user posts content later than the content posting time limit may be displayed. For example, content such as "4 hours late" may be shown anywhere on the presenting page of the content posted by the user, etc. It is to be understood that the above enumerated time such as four hours is merely for illustration without suggesting any limitations as to the scope of the present disclosure.

By sending the system message about shooting and posting of a composite image to a group of users, it is possible to make the image shooting and posting process more interesting, thereby improving user participation and experience.

Reference is still made to FIG. 2. At block 220, the terminal device 110 presents a shooting page in the GUI displayed by the display device. The shooting page includes a first shooting window for presenting a first scene captured by the first camera and a second shooting window for presenting a second scene captured by the second camera. In some embodiments, the first camera and the second camera can be used to take images, which may include static pictures (e.g., photos) or dynamic pictures (e.g., videos) and other multimedia content.

In some embodiments, the first shooting window and the second shooting window can be simultaneously presented in the shooting page. For example, the first shooting window may at least partly overlap the second shooting window. Alternatively, the second shooting window can at least partly overlap the first shooting window as well.

Alternatively, or in addition, in some embodiments where the first camera shoots first and the second camera shoots later, the first shooting window corresponding to the first camera may be presented first in the shooting page. Upon completion of shooting by the first camera, the second shooting window corresponding to the second camera can be presented. In addition, a prompt may be presented to the user to prompt the user to complete the shooting of the second camera within a predetermined duration.

Figure 4A:
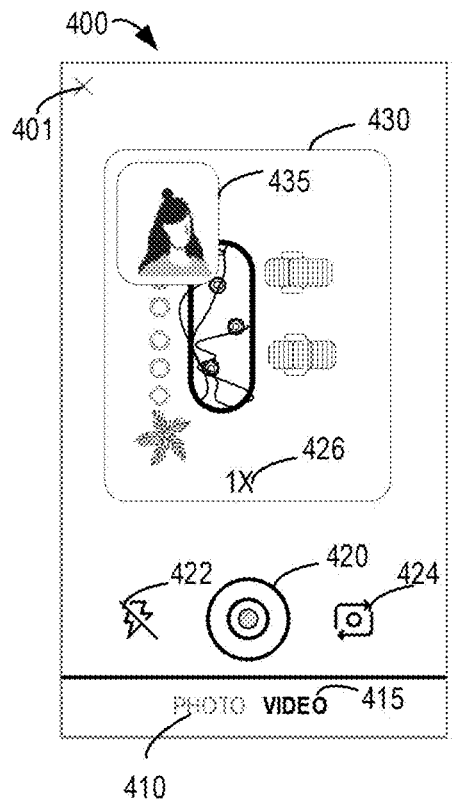
FIGS. 4A and 4B each illustrate a schematic view of an example page related to image shooting according to some embodiments of the present disclosure.

In some embodiments, the first camera and the second camera may be set to take videos on default. FIG. 4A illustrates an example shooting page 400, which includes a first shooting control 420. The first shooting control 420 is configured to take a video, as indicated by a highlighted "Video" tab 415. The first camera and the second camera may be caused to take videos by triggering the first shooting control 420.

Figure 4B:
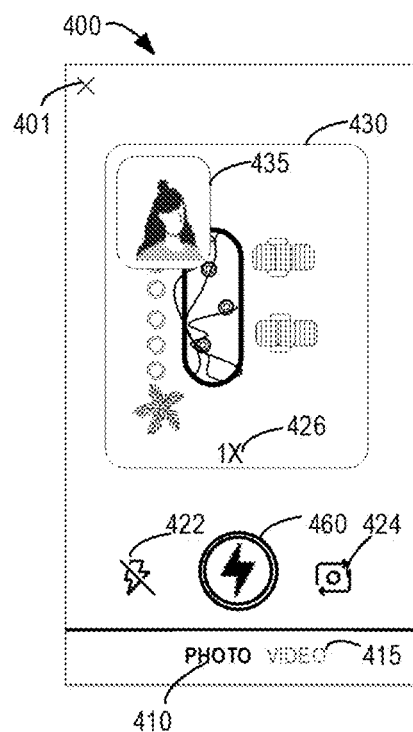

In some embodiments, if it is detected that a "Photo" tab 410 is selected, the flow switches to the shooting for photos (e.g., the "Photo" tab 410 is highlighted), as indicated by a second shooting control 460 in FIG. 4B. It is to be understood that in some embodiments, the first camera and the second camera may also be set to take photos on default. In such a case, the "Video" tab 415 may be triggered to switch to the shooting for videos. The first camera and the second camera may be caused to take photos by triggering the second shooting control 460.

Alternatively, or in addition, the first camera and the second camera may be configured to take different image types. For example, the first camera may be set to take videos, while the second camera may be set to take photos, or vice versa. In some embodiments, a "Mix" tab (not shown) may be presented in the shooting page 400 for selecting different shooting modes for such different cameras.

In some embodiments, the shooting page 400 may include a first shooting window (also referred to as a rear viewfinder window) for presenting a first scene captured by the first camera and a second shooting window 435 (also referred to as a front viewfinder window) for presenting a second scene captured by the second camera. In some embodiments, a first real-time dynamic picture associated with the first camera may be presented in the first shooting window 430. Alternatively, or in addition, a second real-time dynamic picture associated with the second camera may be presented in the second shooting window. The second real-time dynamic picture includes a different scene than the first real-time dynamic picture. For example, the first real-time dynamic picture may include a real-time picture of the environment where the user is located, while the second real-time dynamic picture may include a real-time picture of the user, e.g., a real-time picture of the user's face.

In some embodiment, a zoom factor function 426 may further be set in the first shooting window 430 for zooming the first scene. Alternatively, or in addition, a zoom factor function (not shown) may also be set in the second shooting window 435 for zooming the second scene.

In some examples, the shooting page 400 further provides an exit option 401. If it is detected that the user 140 selects the exit option 401, then the shooting page 400 switches back to the previous page 300.

Alternatively, or in addition, in some embodiments, the shooting page 400 may further provide other control for controlling image shooting. As an example, in FIGS. 4A and 4B, a flash control function 422 is provided for turning on or off the flash; a camera switching function 424 is provided for switching the positions of the first shooting window 430 and the second shooting window 435. Alternatively, or in addition, the shooting page 400 may further provide more functions, which are hidden and may be unfolded by, for example, triggering (e.g., clicking) a position in the shooting page 400 (e.g., the upper right corner or other suitable position). It is to be understood that the functions shown here are merely exemplary, and more, less or other functions may be provided in the shooting page. The embodiments of the present disclosure are not limited in this regard.

Referring back to FIG. 2, at block 230, the terminal device 110 detects a shooting completion indication. For example, the terminal device 110 may detect the shooting completion indication while presenting the shooting page. In some embodiments, the terminal device 110 may detect the shooting completion indication by detecting a triggering command for the shooting control (e.g., the first shooting control 420 or the second shooting control 460) in the shooting page. Methods for triggering the shooting control may, for example, include clicking or selecting the shooting control, triggering in other way such as voice, etc. In the shooting page, the terminal device 110 may detect periodically or in other way whether the shooting control is triggered. Scope of the present disclosure are not limited in this regard.

For example, in an embodiment where the first camera and the second camera are used to take videos, the shooting may begin at the same time as the first and second cameras are initiated at block 210, and the shooting may stop upon detecting that the first shooting control 420 is triggered (i.e., detecting the shooting completion indication). Alternatively, or in addition, a shooting start indication (e.g., the first triggering of the first shooting control 420) and the shooting completion indication (e.g., the second triggering of the first shooting control 420) may be detected by the terminal device 110 upon initiation of the first and second cameras.

For another example, in an embodiment where the first camera and the second camera are used to take photos, the first camera and the second camera take photos when the terminal device 110 detects the triggering of the second shooting control 460 (i.e., detecting the shooting completion indication). For further example, in an example where the first camera is used to take videos and the second camera is used to take photos, the first camera starts to take a video at block 210, or the first camera starts to take a video when the shooting start indication is detected. When the shooting completion indication is detected, the first camera completes the video shooting, and the second camera takes photos. The process in which the first camera takes photos and the second camera takes videos is similar and thus is not detailed here.

At block 240, the terminal device 110 determines whether the shooting completion indication is detected. If the terminal device 110 does not detect the shooting completion indication at block 240, the terminal device 110 may continue to detect the shooting completion indication at block 230. For example, if the shooting completion indication is not detected in the shooting page, then the presentation of the shooting page may be maintained, and the shooting completion indication may be detected periodically or in other way. If other indication is detected in the shooting page, a corresponding operation may be performed according to the other indication.

On the contrary, if the terminal device 110 detects the shooting completion indication at block 240, then the terminal device 110 presents, in the GUI displayed by the display device, a composite image on the shooting page at block 250. The composite image is generated based on a first image taken by the first camera and a second image taken by the second camera. For example, the terminal device 110 may generate the composite image based on the first image and the second image and according to the shape and layout of the first shooting window 430 and the second shooting window 435.

Description has been presented above to the example process of taking and presenting the composite image with the terminal device 110. In this way, the composite image formed by images of a plurality of scenes taken by a plurality of cameras can be obtained. Thus, richer image content can be provided for sharing.

For example, when the user goes outing or visits a tourist attraction, he/she might hope to take clear photos of beautiful scenery in the distance as well as clear facial photos of the user. With the conventional single-camera shooting method, usually it is only possible to use the Selfie function to take photos including the user's face and local environment. The range of the local environment is hard to choose, i.e., it is impossible to take photos of a wide-range environment.

According to embodiments of the present disclosure, the user may utilize a plurality of cameras to shoot desired content, i.e., a composite image composed. The user may post the composite image of the selfie and the photo of the user's environment at the time, for friends to view. Such composite images can make the content shared by users richer and more interesting, thereby improving user participation and experience.

It is to be understood that although various steps are shown in a specific order in the drawings, some or all of these steps may be performed in other order or in parallel. For example, in FIG. 2, block 210 and block 220 may be performed in parallel. With reference to FIGS. 5A to 5G, description is presented below to several examples of taking first and second images and presenting a composite image.

Figure 5A:
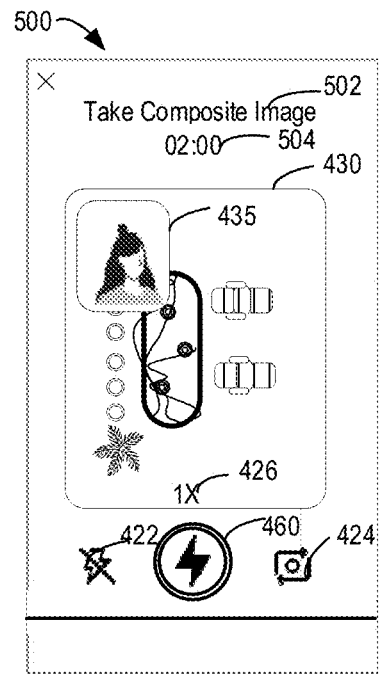
FIGS. 5A to 5G each illustrate a schematic view of an example page related to image shooting according to other embodiments of the present disclosure.

FIG. 5A illustrates a schematic view of an example shooting page 500 related to image shooting according to some embodiments of the present disclosure. For example, the terminal device 110 may present the shooting page 500 in response to the triggering of the shooting start control 320 in the page 300. For another example, the terminal device 110 may present the shooting page 500 in response to the triggering of the "Photo" tab 410 in the shooting page 400. In this example, the first camera and the second camera may be used to take static pictures.

Like the shooting page in FIG. 4B, the shooting page 500 also presents the first shooting window 430 and the second shooting window 435. The first shooting window 430 may present a first real-time dynamic picture. Similarly, the first shooting window 430 or the second shooting window 435 may present a second real-time dynamic picture. Alternatively, in some embodiments, the first shooting window 430 or the second shooting window 435 may also present a static picture. In addition, like the shooting page 400, the shooting page 500 may further present the flash control function 422, the camera switching function 424, the zoom factor function 426, etc. Such functions or controls are not detailed here.

In some embodiments, a text prompt 502, such as "Take Composite Image" or other suitable text, symbols, or labels, may be presented in the shooting page 500 in the GUI to inform the user 140 that a composite image is currently being taken. Alternatively, or in addition, in some embodiments, in response to the shooting page 500 being presented, the terminal device 110 may present a countdown 504 in the GUI for taking the first and second images in order to prompt the user 140 to complete the shooting before the countdown ends. For example, the countdown 504 may have an initial interval of, e.g., 2 minutes or other suitable length. In this way, the user may learn how much time is left for shooting. By limiting the shooting interval, it can be ensured that the obtained composite image is the real-time content taken within a certain time, and thus the content shared by the user is made more meaningful.

Figure 5B:
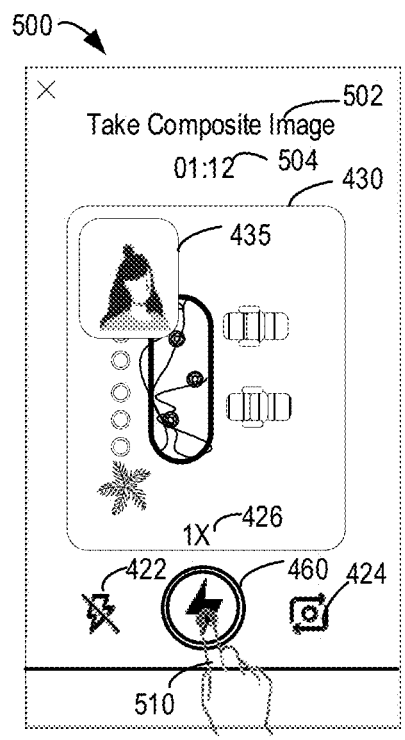

In some embodiments, the terminal device 110 may detect the triggering of the second shooting control 460 before the countdown 504 expires. FIG. 5B illustrates that when the countdown 504 comes to 1 minute and 12 seconds, the terminal device 110 detects the triggering of the second shooting control 460, e.g., the triggering of the second shooting control 460 by a user finger 510. For the sake of discussion, the time at which the shooting completion indication is detected as shown in FIG. 5B is referred to as a "first time." In some embodiments, the detection of the triggering of the second shooting control 460 means the detection of the shooting completion indication.

In some embodiments, in response to detecting the shooting completion indication, the terminal device 110 may trigger the first camera to take the first image at the first time. In addition, the terminal device 110 may further trigger the second camera to take the second image at a second time. In the example of FIG. 5A, the first image may include a first static image, and the second image may include a second static image.

In some embodiments, in addition to or instead of triggering the second shooting control 460, the shooting completion indication may further be triggered in other suitable ways, including but not limited to, voice control, triggering of hardware keys, and specific gestures (e.g., swipe gestures) in specific pages, etc. Scope of the present disclosure are not limited in this regard.

Figure 5C:
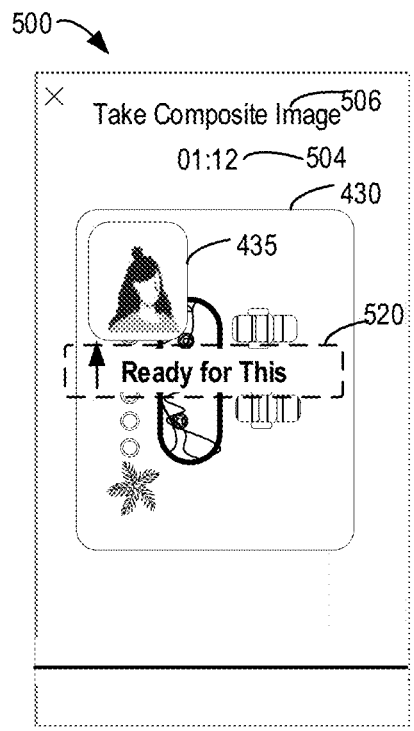

In some embodiments, in response to detecting the shooting completion indication, the terminal device 110 may only trigger the first camera to take the first image at the first time and does not trigger the second camera to take the second image at the first time. In this case, the second camera may take images sometime after the first time. In such an example, in response to detecting the shooting completion indication, the terminal device 110 may further present shooting prompt information (also referred to as a second camera shooting prompt) in the GUI to prompt the user 140 that the second camera is to take images. As shown in FIG. 5C, a second camera shooting prompt 520 is to be presented on the shooting page 500 in the GUI. The second camera shooting prompt 520 may include, for example, an arrow and text "Ready for This." In addition, in FIG. 5C, the presented text prompt 502 is also replaced by a second text prompt 506. For example, the second text prompt may include the text "Take the current image" or other suitable text. In some embodiments, the shooting prompt may further include a countdown of a predetermined interval to prompt the user to shoot at the second time.

It is to be understood that the text and symbols of the prompt information or guidance information presented in FIG. 5C and other drawings herein are only exemplary. The second camera shooting prompt 520 may include any suitable text, symbols, stickers or photographs prompting the user 140 that the second camera is to shoot. The second camera shooting prompt 520 may also use any language, e.g., Chinese, English, etc.

Alternatively, or in addition, the terminal device 110 may trigger the second camera to take the second image at the second time. The second time is separated from the first time by a predetermined duration, e.g., 0.5 seconds or other suitable duration. It is to be understood that various time lengths enumerated herein, e.g., the total countdown duration of 2 minutes, and the predetermined duration of 0.5 seconds are all exemplary and not limiting. The total countdown duration or the predetermined duration of any other length may be adopted. These durations may also be set by the user 140.

In the embodiments as described above, the countdown 504 starts to be displayed from the initiating of the first camera and the second camera. Alternatively, or in addition, in some embodiments, different from the above example, only after the first camera is initiated to take the first image at the first time, the countdown starts to be displayed in order to prompt the user to take an image with the second camera.

In some embodiments, in an example where the first camera shoots first and the second camera shoots after an interval of a predetermined duration, upon completion of the shooting by the first camera, the first shooting window 430 may change from to present the first image instead of the first real-time dynamic picture. In addition, the first shooting window 430 no longer presents the zoom factor function 426. The second shooting window 435 may still present the second real-time dynamic picture, so that the user 140 gets ready for shooting by viewing the second real-time dynamic picture, e.g., posing for better photos, etc. Alternatively, in some embodiments, upon completion of the shooting by the first camera, the first shooting window 430 may be no longer displayed.

By presenting the prompt indication to the user, the user can know when to shoot by the second camera, so as to get ready for shooting in advance. In addition, by delaying the shooting by the second camera by a predetermined period of time over the first camera, sufficient time can be given to the user to be ready for shooting. In this way, it is possible to better facilitate user operation and further take more user-satisfactory images.

Figure 5D:
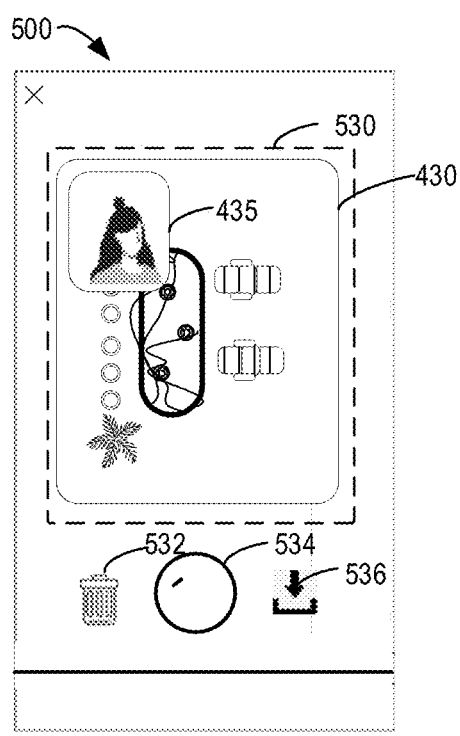

The shooting page 500 in FIG. 5D presents a page which is presented upon completion of the shooting of the first and second images. In some embodiments, the terminal device 110 may generate a composite image based on the first image and the second image and according to the shape and layout of the first shooting window 430 and the second shooting window 435. For example, a composite image 530 in FIG. 5D includes the first image at the position of the first shooting window 430 and the second image at the position of the second shooting window 435.

Alternatively, or in addition, upon completion of the shooting, the shooting page 500 further presents a shooting completion confirm control 534, a delete control 532 and a save control 536, etc. If the triggering of the delete control 532 is detected, the composite image 530 will be deleted. If the triggering of the save control 536 is detected, the composite image 530 will be stored to a local album of the terminal device 110, for example.

Figure 5E:
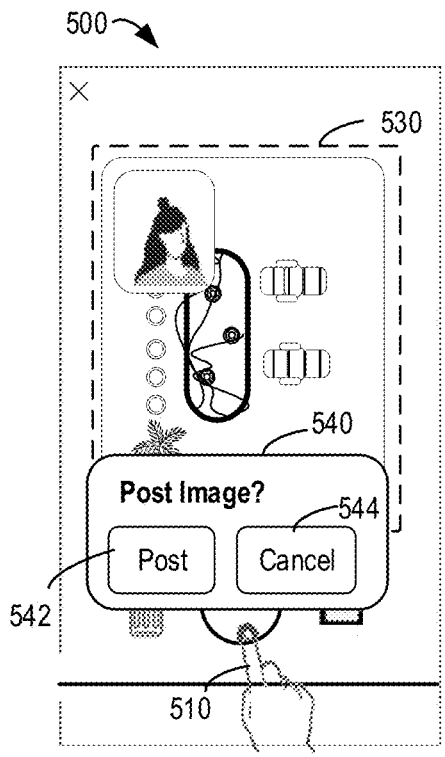

In some embodiments, if the triggering of the shooting completion confirm control 534 is detected, the terminal device 110 may trigger the posting of the composite image 530. As shown in FIG. 5E, if it is detected that the user finger 510 triggers the shooting completion confirm control 534, the terminal device 110 may present an image posting indication in a pop-up window 540 on the shooting page 500. The image posting indication may include a prompt, e.g., "Post Image?" or other similar information. In addition, a post control 542 and a cancel control 544 may further be set in the pop-up window 540. If the triggering of the post control 542 is detected, then the terminal device 110 may post the composite image 530 to the content sharing page of the application 120. If the triggering of the cancel control 544 is detected, then the terminal device 110 may return to the shooting page 500 in FIG. 5A for image shooting again.

Figure 5F:
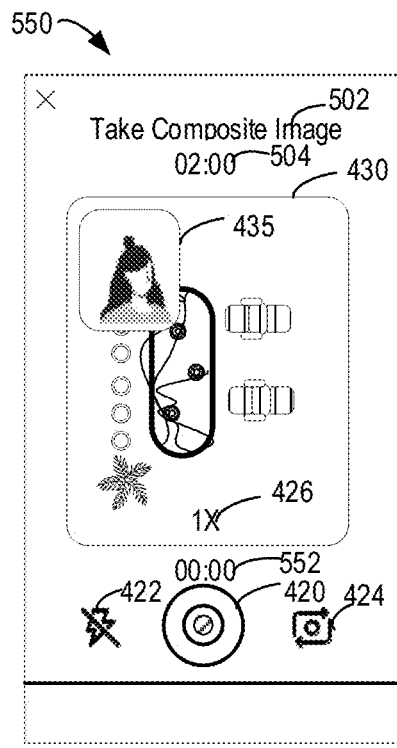

FIG. 5F illustrates a schematic view of an example page 550 related to image shooting according to some embodiments of the present disclosure. For example, the terminal device 110 may present the shooting page 550 in response to the triggering of the shooting start control 320 in the page 300. As another example, the terminal device 110 may present the shooting page 550 in response to the triggering of the "Video" tab 415 in the shooting page 400. In this example, the first camera and the second camera can be used to take dynamic pictures.

Similar to the shooting page 500 in FIG. 5A, the shooting page 550 also presents the first shooting window 430 and the second shooting window 435. The first shooting window 430 may present a first real-time dynamic picture. Similarly, the second shooting window 435 may present a second real-time dynamic picture. In addition, the shooting page 550 may present the text prompt 502, such as "Take a composite image" or other suitable text, symbols, or labels, in order to inform the user 140 that a composite image is currently being taken. Other functions or controls similar to the shooting page 500 will not be detailed.

Different from the shooting page 500 in FIG. 5A, the shooting page 550 presents the first shooting control 420. In addition, the shooting page 550 further presents a shooting time 552 to a current video shooting duration. In some embodiments, the shooting begins at the same as the first camera and the second camera are initiated. In other words, the shooting time 552 counts from this time. Alternatively, or in addition, in some embodiments, while the shooting page 550 is presented, if the triggering of the first shooting control 420 is detected, then the shooting begins, and meanwhile the shooting time 552 counts from 00:00. The time when the shooting begins or the shooting time 552 begins to count is also referred to as a third time.

Alternatively, or in addition, in some embodiments, in response to the shooting page 550 being presented, the terminal device 110 may present the countdown 504 for taking the first image and the second image, in order to prompt the user 140 to complete the shooting before the countdown ends. For example, the countdown 504 may have an initial interval of, e.g., 2 minutes or other suitable length. In this way, the user may learn how much time is left for shooting. By limiting the shooting interval, it can be ensured that the obtained composite image is the real-time content taken within a certain time, and thus the content shared by the user is made more meaningful.

In some embodiments, in addition to or instead of the above shooting mode with interval limitations, it is also possible to implement other shooting modes such as a shooting mode with specific visual effects. Scope the present disclosure is not limited in this regard.

Figure 5G:
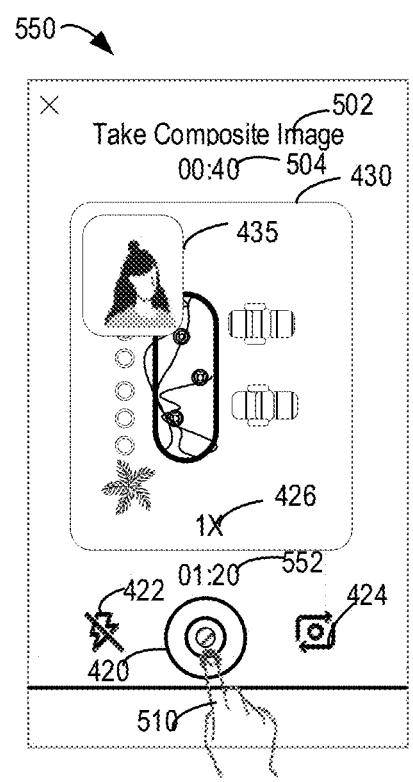

In some embodiments, if the terminal device 110 detects the shooting completion indication, the first camera and the second camera are triggered to end the image shooting. At this point, the shooting time 552 has no more change and the countdown 504 may also stop changing. The time when the picture shooting ends is referred to as a fourth time. FIG. 5G illustrates an example of ending the shooting upon detection of the shooting completion indication. For example, when the countdown 504 goes to 0 minute and 40 seconds, and the shooting time 552 goes to 1 minute and 20 seconds, if it is detected that the user finger 510 triggers the first shooting control 420, then the terminal device 110 triggers the first camera and the second camera to stop shooting. In this example, the first camera has taken a first video with a total duration of 1 minute and 20 seconds as presented in the first shooting window 430. Similarly, the second camera has taken a second video with a total duration of 1 minute and 20 seconds as presented in the second shooting window 435.

In some embodiments, in addition to or instead of triggering the first shooting control 420, the shooting completion indication can be triggered in other suitable ways, including but not limited to voice control, triggering of hardware keys, and specific gestures (e.g., swipe gestures) in specific pages, etc. Scope of the present disclosure are not limited in this regard.

Similar to the process described with reference to the shooting page 500 in FIGS. 5D and 5E, with the terminal device 110 triggering the first camera and the second camera to complete the shooting, a composite image generated from the first and second videos can be presented in the shooting page 550. In addition, an image posting prompt may be shown in a pop-up window on the shooting page 550, for the user 140 to confirm whether to post the composite image. The content presented in the shooting pages involved in these processes is similar to that of the shooting page 500 in FIGS. 5D and 5E, and thus is not detailed here.

Through the above process, the first camera and the second camera take videos and other dynamic pictures, and a final composite image is obtained. The image obtained as such may contain dynamic images of a plurality of scenes, so that richer and more interesting content is provided.

Several examples where the terminal device 110 generates and presents the composite static image have been described in conjunction with FIGS. 5A to 5E, and several examples where the terminal device 110 generates and presents the composite dynamic image have been described in conjunction with FIGS. 5F and 5G. However, it is to be understood that in some embodiments, the terminal device 110 may trigger the first camera and the second camera to take different types of images. For example, the first camera may be triggered to take a dynamic image, while the second camera may be triggered to take a static image, so that a composite image is obtained, and vice versa. The embodiments of the present disclosure may adopt various flexible implementations.

It is to be understood that in the examples described in conjunction with FIGS. 5A to 5G, the obtained composite image may be directly posted. However, in some embodiments, before posting the composite image, the terminal device 110 may further edit the composite image. For example, the terminal device may cut, crop, add filters, add text or stickers to the composite image. Ways of editing the composite image are not limited.

In the above examples of FIGS. 5A to 5G, the first shooting window 430 and the second shooting window 435 are simultaneously presented in the shooting page 500 or the shooting page 550. The second shooting window 435 at least partly overlaps the first shooting window 430. However, in some further embodiments, the two shooting windows in the shooting page may have other shape or layout.

Figure 6A:
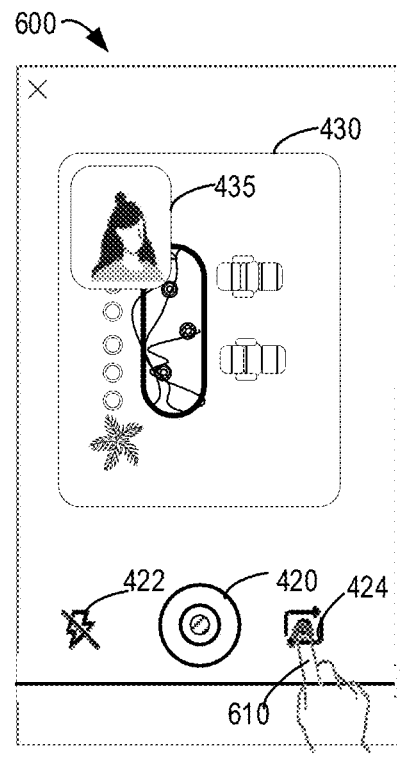
FIGS. 6A to 6D each illustrate a schematic view of an example page related to image shooting according to other embodiments of the present disclosure.
Figure 6B:
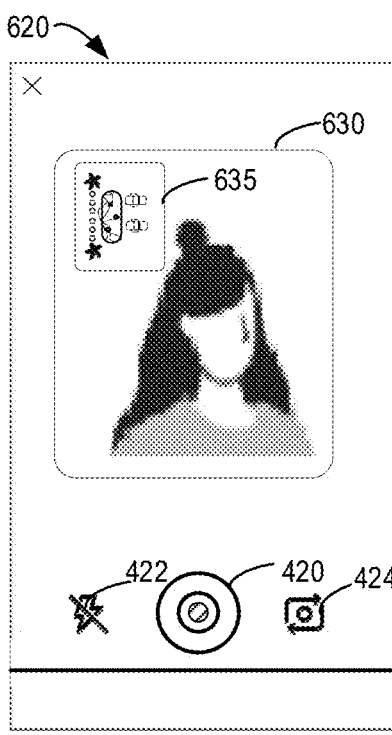

FIGS. 6A to 6D illustrate examples of various shooting pages according to embodiments of the present disclosure. In FIG. 6A, a shooting page 600 presents the first shooting window 430 and the second shooting window 435, just like the shooting page 400. If the terminal device 110 detects a camera switching command, for example, detecting the triggering of the camera switching function 424 by a user finger 610, then as shown in FIG. 6B, the terminal device 110 will change the shooting page 600 to a shooting page 620 in the GUI. As used herein, the term "camera switching command" may also be referred to as a "lens switching command" or "shooting window switching command". In the shooting page 620, a first shooting window 630 presents a second scene captured by the second camera, and a second shooting window 635 presents a first scene captured by the first camera. Of course, if the triggering of the camera switching function 424 is detected in the shooting page 620, then the terminal device 110 will change the shooting page to the shooting page 600.

In some embodiments, the terminal device 110 can, in response to detecting a user command, change the shape or layout of at least one of the first shooting window and the second shooting window. Alternatively, or in addition, the terminal device 110 may change the shape or layout of at least one of the first shooting window and the second shooting window at a predetermined time interval (e.g., one week, one month, or other suitable time interval).

Figure 6C:
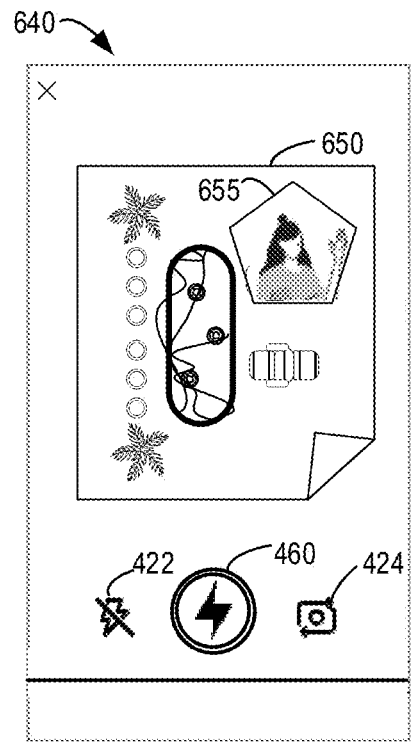

FIG. 6C presents a shooting page 640 with shooting windows of other shape and layout. For example, a first shooting window 650 in the shooting page 640 may include a rectangular shape with a dog ear, and a second shooting window 655 may include a pentagonal shape. The second shooting window 655 may overlap with the upper right position of the first shooting window 650 instead of the upper left position in the example of FIG. 6A.

Figure 6D:
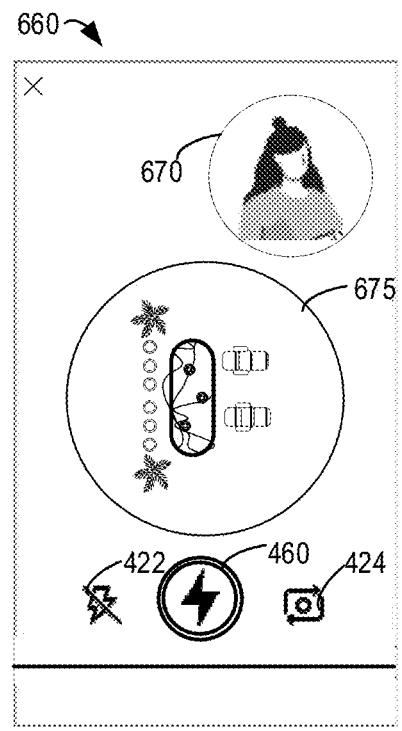

FIG. 6D presents a shooting page 660 with shooting windows of other shape and layout. For example, a first shooting window 670 and a second shooting window 675 in the shooting page 660 may both have a circular shape. Different from the shooting pages 620 and 640, the first shooting window 670 and the second shooting window 675 do not overlap in the shooting page 660.

Several examples of shooting pages with shooting windows of different shapes and layouts have been described in conjunction with FIGS. 6A to 6D. It is to be understood that these examples are merely exemplary and not limiting. The embodiments of the present disclosure may adopt any shapes and layouts for shooting windows. By means of these varying shooting windows, composite images of different shapes and layouts may be presented, which may further be shared to provide more interesting content. In this way, it is possible to provide a more interesting image shooting application and content sharing application and thus improve user experience.

In some embodiments, the application 120 may further provide other functions, such as a composite image sharing function, a composite image viewing function, etc. For example, the user 140 may post a composite image through the composite image sharing function of the application 120. Other users may view the composite image shared by the user 140.

In some embodiments, the terminal device 110 may perform blur processing or mosaic processing on the above composite image to obtain a blurred version of the composite image. The terminal device 110 can generate a blurred image associated with the composite image at least partly based on the blurred version of the composite image. Alternatively, or in addition, in some embodiments, a blurred image associated with the composite image can also be generated by adding an illustration to the blurred version of the composite image. In addition, a blurred image associated with the composite image may be generated by adding a prompt about sharing content to view the composite image on the blurred version of the composite image.

In some embodiments, the terminal device 110 may provide the blurred image associated with the composite image to other user than the user 140. For example, if a certain user does not post content, e.g., a composite image, when the user wants to view the composite image shared by the user 140, a blurred image associated with the composite image shared by the user 140 will be presented to the user. For another example, if a certain user has no association (e.g., a social friend relationship) with the user 140, when the user wants to view the composite image shared by the user 140, a blurred image associated with the composite image shared by the user 140 may be presented to the user.

In this way, it is possible to promote the user to post and share the composite image. In addition, since only friends can view the composite image shared by the user 140, it is possible to prevent the content shared by the user 140 from being viewed by strangers and thus protect the privacy of the user 140.

Examples where the blurred image associated with the composite image posted by the user 140 is provided to other users have been described above. It is to be understood that where the user 140 does not post a composite image or the user 140 has no association with a certain user, when the user 140 wants to view a composite image posted by the user, the user 140 will also see a blurred version associated with the composite image of the user. FIGS. 7A to 7F each illustrate a schematic view of an example of presenting a blurred image associated with a composite image to the user 40 according to some embodiments of the present disclosure.

Figure 7A:
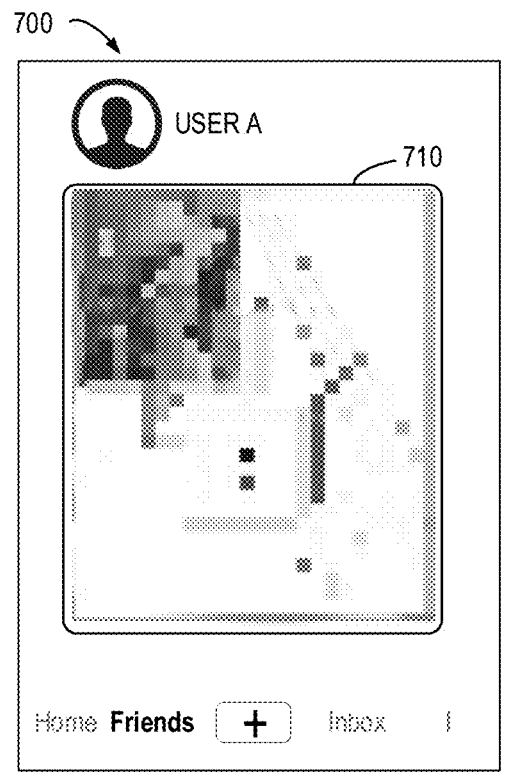
FIGS. 7A and 7F each illustrate a schematic view of an example of presenting a blurred image associated with a composite image to a user according to some embodiments of the present disclosure.
Figure 7B:
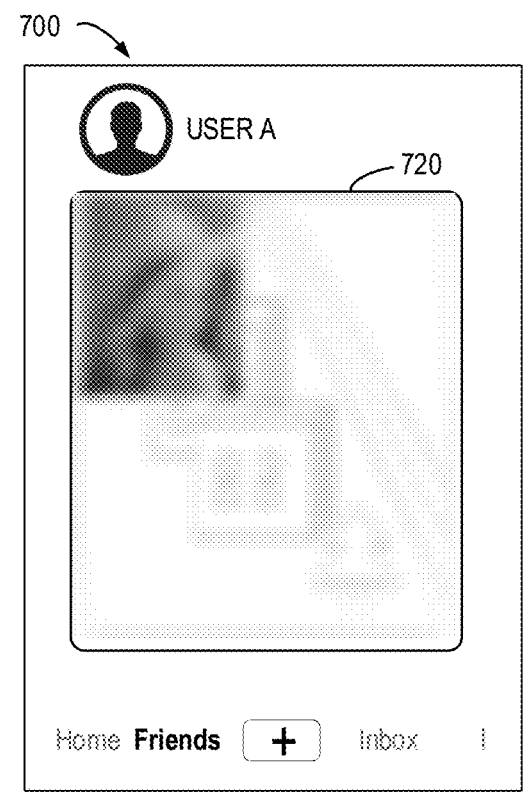
FIG. 7G illustrates a schematic view of an example of presenting the composite image to the user according to some embodiments of the present disclosure.
Figure 7C:
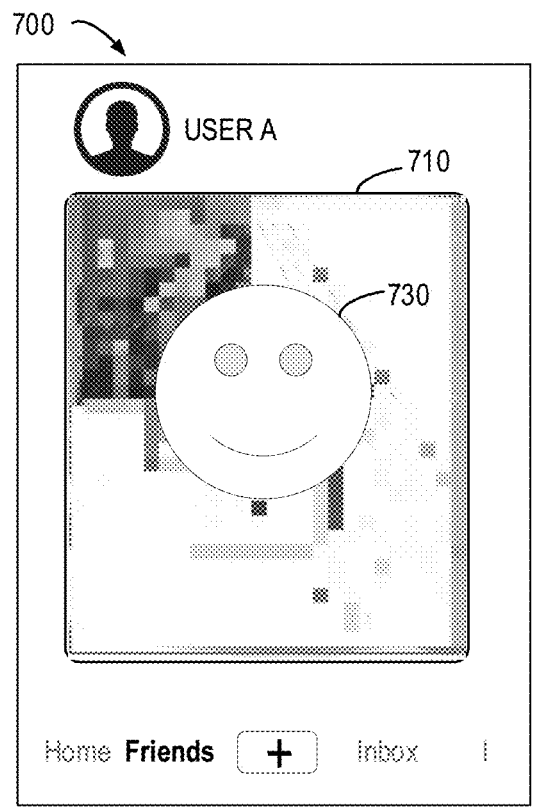

FIG. 7A illustrates a page 700 of the application 120. The page 700 may be presented in a page, e.g., with the tab "Friends" displayed at the bottom of the page. In the page 700, the user 140 may want to view a composite image shared by another user (also referred to as user A). In the example of FIG. 7A, a blurred image presented to the user 140 comprises a blurred version 710 of a composite image obtained by mosaicking the composite image posted by user A. Similarly, in the example of FIG. 7B, the blurred image comprises a blurred version 720 obtained from blur processing on the composite image posted by user A, i.e., image bokeh.

Alternatively, or in addition, in some embodiments, the blurred image further comprises an illustration overlapping the blurred version of the composite image. For example, in the example of FIG. 7C, the blurred image presented to the user 140 comprises the blurred version 710 of the composite image as well as an illustration 730. Likewise, in the example of FIG. 7D, the blurred image presented to the user 140 comprises the blurred version 720 of the composite image and the illustration 730. For purposes of explanation, a smiley picture is used as an example of the illustration 730. This is merely an example and other kind of suitable picture can be used as the illustration. Different users may adopt the same or different illustrations. The illustration may be configured by the terminal system 110 or selected by the user 140.

Figure 7D:
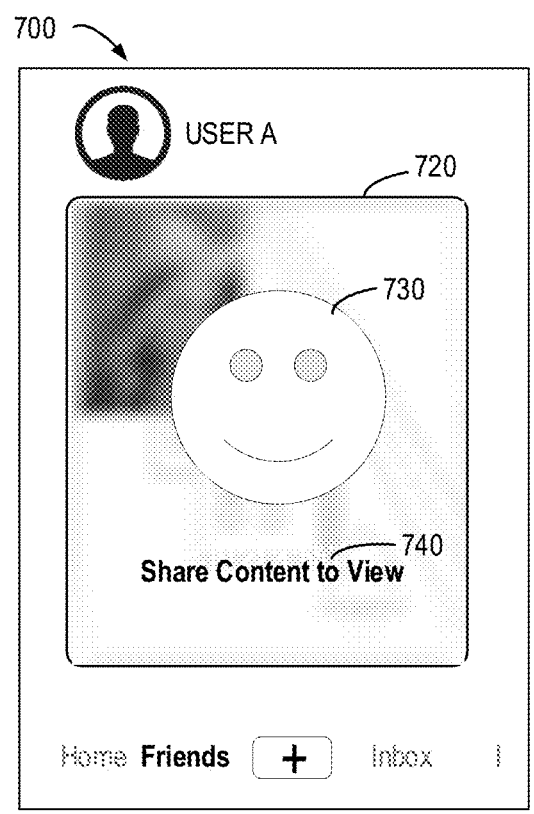
Figure 7E:
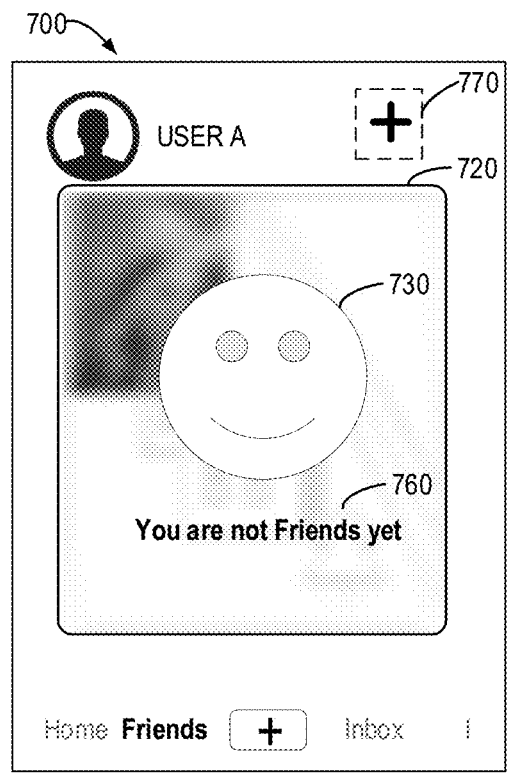
Figure 7F:
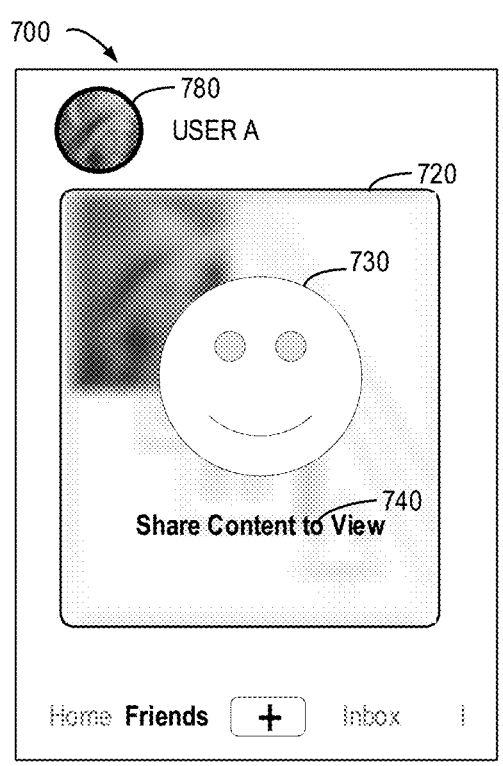

In some embodiments, the blurred image further includes an indication of sharing the content to view the first content, e.g., an indication 740 in FIG. 7D. Although the blurred image comprises both the illustration 730 and the indication 740 in the example of FIG. 7D, in some embodiments, the blurred image may only comprise one of the illustration 730 and the indication 740.

It is to be understood that the indication 740 shown in FIG. 7D is merely exemplary, and the indication 740 may comprise different content. For example, where the user 140 does not post a composite image, the indication 740 may be "Share Content to View." Where the user 140 has no association with user A, an indication 760 in FIG. 7E may be presented in the GUI, such as "You are not friends yet" or other similar text, stickers, etc. Alternatively, or in addition, in the example where the user 140 has no association with user A, the page 700 may further be provided with an add friend control 770. When the user triggers the add friend control 770, the user 140 sends a friend application to user A.

In some embodiments, if the terminal device 110 determines that the user 140 has not posted a composite image, the terminal device 110 may further present the blurred profile photo of user A to the user 140. For example, there is shown in the page 700 of FIG. 7F that the profile photo of user A is a blurred profile photo 780. Alternatively, or in addition, if the user 140 has no association with user A, then the profile photo of user A which is presented to the user 140 may have been subjected to blur processing.

In some embodiments, in addition to the blurred profile photo of the profile photo of user A presented in the page 700, it is also possible to use the blurred profile photo of user A in other pages such as the search box of the friend page, media stream, the skylight of the friends page, the inbox, etc. As another example, if the user 140 receives sharing information or reposting information of the composite image of user A as sent from other user, the profile photo of user A presented on the sharing information or reposting information seen by the user 140 may also be a blurred profile photo. Similarly, the composite image posted by user A seen by the user 140 in the sharing information or reposting information may also be a blurred image associated with the composite image.

Figure 7G:
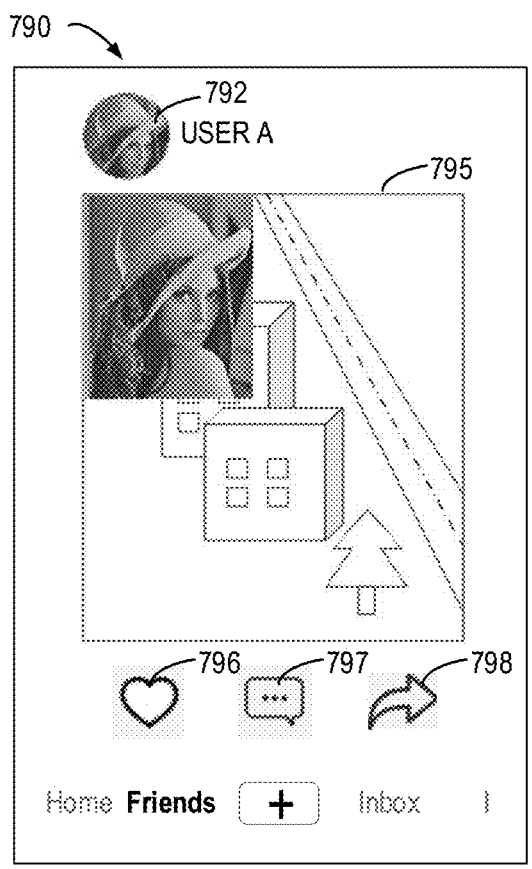

In some embodiments, when the user 140 has an association with user A and the user 140 posts a composite image, the terminal device 110 may present the composite image posted by user A to the user 140. FIG. 7G illustrates a schematic view of an example of presenting a composite image to a user according to some embodiments of the present disclosure.

In a page 790 of FIG. 7G, unlike FIGS. 7A to 7F, the terminal device 110 presents a composite image 795 shared by user A to the user 140. Alternatively, or in addition, unlike the blurred profile photo 780 presented in FIG. 7F, a clear profile photo 792 of user A is presented in the page 790. In some embodiments, the page 790 is further provided with a plurality of interaction controls (also referred to as interaction icons), such as a like control 796, a comment control 797, a repost control 798 and any other suitable interaction control (not shown). The user 140 may like the composite image 795 posted by user A by triggering the like control 796. The user 140 may add a comment to the composite image 795 posted by user A by triggering the comment control 797. Also, the user 140 may repost the composite image posted by user A to other user by triggering the repost control 798.

Alternatively, or in addition, in some embodiments, the presented composite image 795 may further have time information (not shown) of the composite image 795. For example, the time information may be time when the composite image 795 is created (e.g., taken), or time when the composite image 795 is shared. The time information may be displayed in the form of a timestamp, e.g., a vintage postmark, or may be presented in other suitable form. In addition, in some embodiments, the page 790 may further present the difference between the time when the user shared the content and the time when the user received the system message 342. For example, if the user received a message about taking and posting composite content at 10:00 am, and the user did not share the content until 2:00 pm, then it can be presented in a suitable position on the page 790, e.g., the right side of the user's profile photo, that the sharing is 4 hours late. It is to be understood that various time enumerated above is merely exemplary and not limiting. The user may receive a push about a content sharing prompt at any time and may also share content at any time.

The above examples have described additional functions provided by the application 120. These functions are merely exemplary and not limiting. The application 120 may provide less or richer functions. These functions make the application 120 interesting, and thus user participation and experience is improved.

It is to be understood that various pages shown herein are merely exemplary, and in practice there may exist various page designs. Various graphical elements in the page may have different arrangements and visual representations, among which one or more of them may be omitted or replaced. Further, there may exist one or more other elements. The embodiments of the present disclosure are not limited in this regard.

Figure 8:
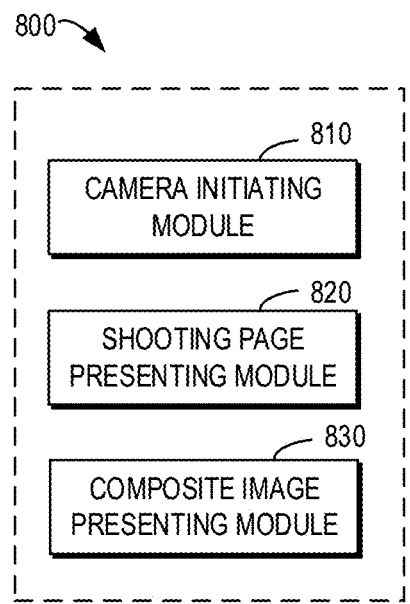
FIG. 8 illustrates a block diagram of an apparatus for image shooting according to some embodiments of the present disclosure.

FIG. 8 illustrates a block diagram of an apparatus 800 for image shooting according to some embodiments of the present disclosure. The apparatus 800 may be implemented at or included in the terminal device 110. Various modules/components of the apparatus 800 may be implemented by hardware, software, firmware or any combinations thereof.

As depicted, the apparatus 800 comprises a camera initiating module 810, which is configured to initiate a first camera and a second camera different from the first camera for image shooting. The image may be a static image, a dynamic image or a combination thereof. In some embodiments, the camera initiating module 810 is configured to initiate the first camera and the second camera in response to receiving a camera initiating command. For example, the camera initiating command may be provided by the user 140 in response to a system message about providing an image. In some embodiments, the system message may be used to prompt the user 140 to post content of a corresponding category within a specified time. Alternatively, or in addition, the system message may further indicate a category of at least one of the first and second images.

In some embodiments, the system message is provided to the terminal device 110 (also referred to as a first device) of the user 140 and other device (also referred to as a second device) of other user than the user 140, for guiding the user 140 and the other user to take a composite image of a same category.

The apparatus 800 further comprises a shooting page presenting module 820, which is configured to present a shooting page. The shooting page comprises a first shooting window (e.g., the first shooting window 430) for presenting a first scene captured by the first camera and a second shooting window (e.g., the second shooting window 435) for presenting a second scene captured by the second camera.

In some embodiments, the shooting page presenting module 820 comprises a first dynamic presenting module, which is configured to present a first real-time dynamic picture associated with the first camera in the first shooting window of the shooting page. Alternatively, or in addition, the shooting page presenting module 820 may further comprise a second dynamic presenting module, which is configured to present a second real-time dynamic picture associated with the second camera in the second shooting window of the shooting page. The second real-time dynamic picture comprises a scene different from the first real-time dynamic picture.

In some embodiments, the shooting page presenting module 820 comprises an overlap presenting module, which is configured to present the first and second shooting windows simultaneously in the shooting page. One of the first and second shooting windows at least partly overlapping the other of the first and second shooting windows. For example, the second shooting window may at least partly overlap the first shooting window. Alternatively, the first shooting window may also at least partly overlap the second shooting window.

Alternatively, or in addition, in some embodiments, the shooting page presenting module 820 is configured to present the first shooting window corresponding to the first camera in the shooting page first, and upon completion of the shooting by the first camera, present the second shooting window corresponding to the second camera, and prompt the user to complete a shooting by the second camera within a predetermined duration.

The apparatus 800 further comprises a composite image presenting module 830, which is configured to present a composite image on the shooting page in response to an indication of shooting completion. The composite image is generated based on the first image taken by the first camera and the second image taken by the second camera. For example, the composite image may comprise a composite picture or a composite video.

In some embodiments, the apparatus 800 further comprises a first shooting causing module, which is configured to, in response to detecting the indication of shooting completion at a first time, cause the first camera to take the first image at the first time. The apparatus 800 may further comprise a shooting prompt module, which is configured to present a shooting prompt to indicate that the second camera is to be used for shooting. The apparatus 800 may further comprise a second shooting causing module, which is configured to cause the second camera to take the second image at a second time. The second time is separated from the first time by a predetermined interval. For example, the predetermined interval may be 0.5 seconds, 1 second or other suitable duration. In some embodiments, the shooting prompt may indicate a countdown of a predetermined interval to prompt the user 140 to shoot at the second time.

In some embodiments, the apparatus 800 further comprises a composite image generating module, which is configured to generate the composite image based on the first and second images according to a shape and a layout of the first and second shooting windows.

In some embodiments, the apparatus 800 further comprises a window adjusting module, which is configured to change a shape and a layout of at least one of the first and second shooting windows. For example, the window adjusting module may change the shape and layout of the first shooting window or the second shooting window according to a predetermined rule or in response to a user trigger.

In some embodiments, the apparatus 800 further comprises a scene switching module, which is configured to, in response to a camera switching command, present the second scene captured by the second camera via the first shooting window, and present the first scene captured by the first camera via the second shooting window.

In some embodiments, the apparatus 800 further comprises a countdown presenting module, which is configured to, in response to the shooting page being presented, present a countdown for taking the first and second images to prompt the user 140 to complete the shooting before the countdown expires.

In some embodiments, the apparatus 800 further comprises a blur processing module, which is configured to perform blur processing or mosaic processing on the composite image to obtain a blurred version of the composite image. Alternatively, or in addition, the apparatus 800 further comprises a blurred image generating module, which is configured to generate a blurred image associated with the composite image at least based on the blurred version of the composite image. In some embodiments, the blurred image generating module is further configured to add an illustration to the blurred version of the composite image to generate the blurred image; or add an indication of sharing content to view the composite image to the blurred version of the composite image to generate the blurred image.

In some embodiments, the apparatus 800 further comprises a blurred image providing module, which is configured to provide the blurred image associated with the composite image to a further user that is different from the user 140 taking the composite image. For example, the further user may be a user who does not posted content. For another example, the further user may be a user having no association with the user 140.

Figure 9:
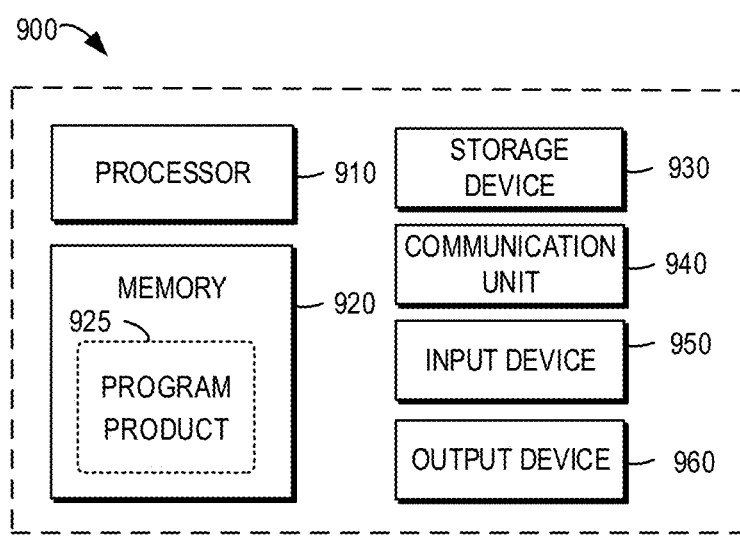
FIG. 9 illustrates an electronic device in which one or more embodiments of the present disclosure can be implemented.

FIG. 9 illustrates a block diagram of an electronic device 900 in which one or more embodiments of the present disclosure can be implemented. It is to be understood that the electronic device 900 as shown in FIG. 9 is merely provided as an example, without suggesting any limitation to the functionalities and scope of the embodiments described herein. The electronic device 900 shown in FIG. 9 may be used to implement the terminal device 110 of FIG. 1.

As shown in FIG. 9, the electronic device 900 is in the form of a general-purpose electronic device. Components of the electronic device 900 may include, without limitation to, one or more processors or processing units 910, a memory 920, a storage device 930, one or more communication units 940, one or more input devices 950 as well as one or more output devices 960. The processing unit 910 may be a real or virtual processor and can execute various processing according to programs stored in the memory 920. In a multi-processor system, a plurality of processing units execute in parallel computer-executable instructions to increase the parallel processing capability of the electronic device 900.

The electronic device 900 usually includes various computer storage media. Such media may be any available media accessible by the electronic device 900, including but not limited to, volatile and non-volatile media, or detachable and non-detachable media. The memory 920 may be a volatile memory (for example, a register, cache, Random Access Memory (RAM)), non-volatile memory (for example, a Read-Only Memory (ROM), Electrically Erasable Programmable Read-Only Memory (EEPROM), a flash memory), or any combination thereof. The storage device 930 may be any detachable or non-detachable medium and may include machine-readable medium such as a flash memory drive, a magnetic disk or any other media that can be used for storing information and/or data (e.g., training data for training) and are accessible within the electronic device 900.

The electronic device 900 may further include additional detachable/non-detachable, volatile/non-volatile memory media. Although not shown in FIG. 9, there may be provided a disk drive for reading from or writing into a detachable and non-volatile disk (e.g., a floppy disk), and an optical disk drive for reading from and writing into a detachable non-volatile optical disk. In such cases, each drive may be connected to a bus (not shown) via one or more data medium interfaces. The memory 920 may include a computer program product 925 having one or more program modules which are configured to perform various methods or acts according to various embodiments of the present disclosure.

The communication unit 940 implements communication with another computing device via the communication medium. In addition, the functionalities of components in the electronic device 900 may be implemented by a single computing cluster or a plurality of computing machines that can communicate with each other via communication connections.

Thus, the electronic device 900 may operate in a networked environment using a logic connection with one or more other servers, network personal computers (PCs), or further general network nodes.

The input device 950 may include one or more of a variety of input devices, such as a mouse, keyboard, trackball and the like. The output device 960 may be one or more output devices, such as a display, loudspeaker, printer and the like. By means of the communication unit 940, the electronic device 900 may further communicate with one or more external devices (not shown) such as storage devices and display devices, one or more devices that enable the user to interact with the electronic device 900, or any devices (such as a network card, a modem and the like) that enable the electronic device 900 to communicate with one or more other computing devices, if required. Such communication may be performed via input/output (I/O) interfaces (not shown).

The electronic device 900 may further be provided with a plurality of cameras, e.g., the first camera and the second camera. The first camera and the second camera may communicate with other component of the electronic device 900 or an external device via the communication unit 940.

According to example implementations of the present disclosure, there is provided a computer-readable storage medium with computer-executable instructions stored thereon, wherein the computer-executable instructions are executed by a processor to realize the methods described above. According to example implementations of the present disclosure, there is further provided there is provided a computer program product tangibly stored on a non-transient computer-readable medium and comprising computer-executable instructions which are executed by a processor to realize the methods described above.

Aspects of the present disclosure are described herein with reference to flowchart illustrations and/or block diagrams of methods, apparatus (systems), and computer program products according to implementations of the present disclosure. It will be understood that each block of the flowchart illustrations and/or block diagrams, and combinations of blocks in the flowchart illustrations and/or block diagrams, can be implemented by computer-readable program instructions.

These computer readable program instructions may be provided to a processing unit of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

We claim:

1. A method for image shooting, comprising:
   initiating a first camera and a second camera different from the first camera for image shooting;
   presenting, in a graphical user interface displayed by a display device, a shooting page comprising a first shooting window for presenting a first scene captured by the first camera and a second shooting window for presenting a second scene captured by the second camera;
   in response to a camera switching command,
      presenting, in the graphical user interface, the second scene captured by the second camera via the first shooting window; and
      presenting, in the graphical user interface, the first scene captured by the first camera via the second shooting window; and
   in response to an indication of shooting completion,
      generating a composite image based on a first image and a second image according to shapes and layouts of the first and second shooting windows, the first image taken by the first camera and the second image taken by the second camera; and
      presenting, in the graphical user interface, the composite image on the shooting page.

2. The method of claim 1, further comprising:
   in response to detecting the indication of shooting completion at a first time,
      causing the first camera to take the first image at the first time;
      presenting, in the graphical user interface, a shooting prompt to indicate that the second camera is to be used for shooting; and
      causing the second camera to take the second image at a second time, the second time separated from the first time by a predetermined interval.

3. The method of claim 2, wherein the shooting prompt indicates a countdown of the predetermined interval to prompt a user to shoot at the second time.

4. The method of claim 1, wherein presenting the shooting page comprises at least one of the following:
   presenting a first real-time dynamic picture associated with the first camera in the first shooting window of the shooting page; or
   presenting a second real-time dynamic picture associated with the second camera in the second shooting window of the shooting page, the second real-time dynamic picture comprising a scene different from the first real-time dynamic picture.

5. The method of claim 1, wherein presenting the shooting page comprises:
   presenting the first and second shooting windows simultaneously in the shooting page, one of the first and second shooting windows at least partly overlapping the other of the first and second shooting windows.

6. The method of claim 1, wherein presenting the shooting page comprises:
   presenting the first shooting window corresponding to the first camera in the shooting page first; and
   upon completion of the shooting by the first camera, presenting the second shooting window corresponding to the second camera, and
   prompting a user to complete shooting by the second camera within a predetermined duration.

7. The method of claim 1, further comprising:
   changing a shape and a layout of at least one of the first and second shooting windows.

8. The method of claim 1, further comprising:
   in response to the shooting page being presented, presenting, in the graphical user interface, a countdown of a predefined time interval for taking the first and second images to prompt a user that the user is expected to complete shooting before the predefined time interval expires.

9. The method of claim 1, wherein the composite image comprises a composite picture or a composite video.

10. The method of claim 1, wherein initiating the first camera and the second camera comprises:
    in response to receiving a camera initiating command of the first and second cameras, initiating the first and second cameras, the camera initiating indication provided by a user in response to a system message about providing a composite image, the system message being received via a first device communicatively coupled to the first and second cameras.

11. The method of claim 10, wherein the system message is used to prompt the user to post a composite image of a predetermined category within a specified time period.

12. The method of claim 10, wherein the system message indicates a category of at least one of the first and second images.

13. The method of claim 10, wherein the system message is further provided to a second device of a further user different from the user, the second device being different from the first device, the system message guiding the user and the further user to take composite images of a predetermined category.

14. The method of claim 1, wherein the first and second images are taken by a first user, and the method further comprises:
    performing blur or mosaic processing on the composite image to obtain a blurred version of the composite image;
    generating a blurred image associated with the composite image at least based on the blurred version of the composite image; and
    providing the blurred image associated with the composite image to a second user who is different from the first user.

15. The method of claim 14, wherein generating the blurred image comprises at least one of the following:
    generating the blurred image by adding an illustration to the blurred version of the composite image; or
    generating the blurred image by adding, to the blurred version of the composite image, an instruction of sharing an image content in order to view the composite image.

16. The method of claim 15, wherein the second user does not post an image content via an image sharing application, the blurred image associated with the composite image being provided to the second user via the image sharing application, or
    the second user has no association with the first user.

17. An electronic device, comprising:
    at least one processing unit;
    a first camera and a second camera different from the first camera;
    a display device; and at least one memory, coupled to the at least one processing unit and storing instructions to be executed by the at least one processing unit, the instructions, when executed by the at least one processing unit, causing the electronic device to:

initiate the first and second cameras for image shooting;

present, in a graphical user interface displayed by the display device, a shooting page comprising a first shooting window for presenting a first scene captured by the first camera and a second shooting window for presenting a second scene captured by the second camera;

in response to a camera switching command,
- present, in the graphical user interface, the second scene captured by the second camera via the first shooting window; and
- present, in the graphical user interface, the first scene captured by the first camera via the second shooting window; and in response to an indication of shooting completion,
- generate a composite image based on a first image and a second image according to shapes and layouts of the first and second shooting windows, the first image taken by the first camera and the second image taken by the second camera; and
- present, in the graphical user interface, the composite image on the shooting page.

18. A non-transitory computer-readable storage medium, with a computer program stored thereon, the computer program being executable by a processor to implement a method for image shooting, the method comprising:

initiating a first camera and a second camera different from the first camera for image shooting;

presenting, in a graphical user interface displayed by a display device, a shooting page comprising a first shooting window for presenting a first scene captured by the first camera and a second shooting window for presenting a second scene captured by the second camera;

in response to a camera switching command,
- presenting, in the graphical user interface, the second scene captured by the second camera via the first shooting window; and
- presenting, in the graphical user interface, the first scene captured by the first camera via the second shooting window; and in response to an indication of shooting completion,
- generating a composite image based on a first image and a second image according to shapes and layouts of the first and second shooting windows, the first image taken by the first camera and the second image taken by the second camera; and
- presenting, in the graphical user interface, the composite image on the shooting page.

* * * * *